US012152220B2

(12) United States Patent
Man et al.

(10) Patent No.: US 12,152,220 B2
(45) Date of Patent: Nov. 26, 2024

(54) PEG-MODIFIED CASTOR OIL BASED COMPOSITIONS FOR MICROEMULSIFYING AND REMOVING MULTIPLE OILY SOILS

(71) Applicant: ECOLAB USA INC., Saint Paul, MN (US)

(72) Inventors: Victor Fuk-Pong Man, Saint Paul, MN (US); Gang Pu, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 392 days.

(21) Appl. No.: 17/305,363

(22) Filed: Jul. 6, 2021

(65) Prior Publication Data

US 2022/0002636 A1 Jan. 6, 2022

Related U.S. Application Data

(60) Provisional application No. 62/705,588, filed on Jul. 6, 2020.

(51) Int. Cl.
*C11D 1/72* (2006.01)
*C11D 1/74* (2006.01)
(Continued)

(52) U.S. Cl.
CPC .............. *C11D 1/74* (2013.01); *C11D 1/8255* (2013.01); *C11D 1/8305* (2013.01);
(Continued)

(58) Field of Classification Search
CPC .. C11D 1/72; C11D 1/74; C11D 1/825; C11D 1/83; C11D 1/835
See application file for complete search history.

(56) References Cited

U.S. PATENT DOCUMENTS 2,096,837 A 10/1937 Baker
2,198,354 A 4/1940 Tjaarda
(Continued)

FOREIGN PATENT DOCUMENTS

BR 102016000880 A2 7/2017
DE 19523320 A1 1/1997
(Continued)

OTHER PUBLICATIONS

International Searching Authority in connection with PCT/US2021/040526 filed Jul. 6, 2021, "The International Search Report and the Written Opinion of the International Searching Authority, or the Declaration", mailed Nov. 5, 2021.
(Continued)

*Primary Examiner* — Brian P Mruk
(74) *Attorney, Agent, or Firm* — McKee, Voorhees & Sease, PLC

(57) ABSTRACT

Compositions are disclosed that include PEG-modified triglycerides as a surfactant. The mixtures form stable microemulsions with oils and fatty acids which can be the resultant product, such as lubricants, sunscreens, or triglyceride-based products. These emulsions or microemulsions are stable, irreversible, and can be created at low temperature. These can be used in detergents, rinse aids and the like to form microemulsions to remove oils and greasy soils, such as non-trans fats and fatty acids from substrates/surfaces often without the need for linker or other cosurfactants. Methods of making the compositions/microemulsions are included as well as uses thereof.

46 Claims, 2 Drawing Sheets

(51) Int. Cl.
*C11D 1/825* (2006.01)
*C11D 1/83* (2006.01)
*C11D 1/835* (2006.01)
*C11D 1/94* (2006.01)
*C11D 3/43* (2006.01)
*C11D 17/00* (2006.01)
*C11D 1/66* (2006.01)

(52) U.S. Cl.
CPC ............ *C11D 1/8355* (2013.01); *C11D 1/945* (2013.01); *C11D 3/43* (2013.01); *C11D 17/0021* (2013.01); *C11D 1/662* (2013.01); *C11D 1/72* (2013.01); *C11D 2111/12* (2024.01); *C11D 2111/14* (2024.01)

(56) References Cited

U.S. PATENT DOCUMENTS

| | | | |
|---|---|---|---|
| 2,301,989 | A | 11/1942 | Zamborsky |
| 2,367,719 | A | 1/1945 | Gallay |
| 2,396,742 | A | 3/1946 | Milliken |
| 2,410,796 | A | 11/1946 | Newbery et al. |
| 2,436,414 | A | 2/1948 | Arnemo |
| 2,444,870 | A | 7/1948 | Clifford |
| 2,472,564 | A | 6/1949 | Britten, Jr. |
| 2,487,270 | A | 11/1949 | Peterson et al. |
| 2,516,816 | A | 7/1950 | Wagner et al. |
| 2,523,207 | A | 9/1950 | Fowler et al. |
| 2,533,950 | A | 12/1950 | McCormick |
| 2,539,987 | A | 1/1951 | Burger |
| 2,562,329 | A | 7/1951 | O'Brien |
| 2,572,107 | A | 10/1951 | Butin |
| 2,595,025 | A | 4/1952 | Tripplehorn |
| 2,596,994 | A | 5/1952 | Haberland |
| 2,600,854 | A | 6/1952 | Cross |
| 2,647,311 | A | 8/1953 | Arden |
| 3,787,566 | A | 1/1974 | Gauvreau |
| 4,096,240 | A | 6/1978 | Mathur |
| 4,220,665 | A | 9/1980 | Klein |
| 4,258,052 | A | 3/1981 | Yu et al. |
| 4,336,151 | A | 6/1982 | Like et al. |
| 4,511,486 | A | 4/1985 | Shah |
| 4,714,568 | A | 12/1987 | Hurnik et al. |
| 4,725,609 | A | 2/1988 | Kull, Jr. et al. |
| 4,758,599 | A | 7/1988 | Minetti |
| 4,857,302 | A | 8/1989 | Decker, Jr. et al. |
| 5,015,228 | A | 5/1991 | Columbus et al. |
| 5,047,249 | A | 9/1991 | Rothman et al. |
| 5,073,371 | A | 12/1991 | Turner et al. |
| 5,167,950 | A | 12/1992 | Lins |
| D338,585 | S | 8/1993 | Bell et al. |
| 5,250,290 | A | 10/1993 | Giacomoni et al. |
| 5,254,331 | A | 10/1993 | Mausner |
| 5,256,401 | A | 10/1993 | Duckenfield et al. |
| 5,265,772 | A | 11/1993 | Bartasevich et al. |
| 5,266,598 | A | 11/1993 | Ninomiya et al. |
| D343,751 | S | 2/1994 | Bell et al. |
| D346,332 | S | 4/1994 | Kanfer et al. |
| 5,336,497 | A | 8/1994 | Guerrero et al. |
| 5,370,267 | A | 12/1994 | Schroeder |
| 5,441,178 | A | 8/1995 | Wysocki |
| 5,443,236 | A | 8/1995 | Bell et al. |
| 5,449,137 | A | 9/1995 | Bell et al. |
| 5,462,688 | A | 10/1995 | Lippman et al. |
| D365,509 | S | 12/1995 | Bell et al. |
| D365,518 | S | 12/1995 | Wysocki |
| D365,755 | S | 1/1996 | Kanfer et al. |
| 5,523,014 | A | 6/1996 | Dolan et al. |
| 5,558,453 | A | 9/1996 | Bell et al. |
| 5,587,358 | A | 12/1996 | Sukigara et al. |
| 5,625,659 | A | 4/1997 | Sears |
| 5,629,006 | A | 5/1997 | Hoang et al. |
| 5,635,462 | A | 6/1997 | Fendler et al. |
| D383,001 | S | 9/1997 | Bell et al. |
| D385,795 | S | 11/1997 | Wysocki et al. |
| 5,718,353 | A | 2/1998 | Kanfer et al. |
| 5,719,113 | A | 2/1998 | Fendler et al. |
| D392,136 | S | 3/1998 | Ross et al. |
| 5,725,131 | A | 3/1998 | Bell et al. |
| D400,799 | S | 11/1998 | Bell et al. |
| 5,833,998 | A | 11/1998 | Biedermann et al. |
| 5,853,700 | A | 12/1998 | Gormley et al. |
| 5,880,088 | A | 3/1999 | Lentsch et al. |
| 5,902,778 | A | 5/1999 | Hartmann et al. |
| D411,456 | S | 6/1999 | Mast et al. |
| 5,939,082 | A | 8/1999 | Oblong et al. |
| 5,944,227 | A | 8/1999 | Schroeder et al. |
| D415,343 | S | 10/1999 | Maddox |
| 5,962,482 | A | 10/1999 | Bissett |
| 5,968,528 | A | 10/1999 | Deckner et al. |
| 5,972,356 | A | 10/1999 | Peffly et al. |
| D416,417 | S | 11/1999 | Ross et al. |
| 5,980,921 | A | 11/1999 | Biedermann et al. |
| 5,989,523 | A | 11/1999 | Fitzjarrell |
| 5,996,851 | A | 12/1999 | Dolan et al. |
| 5,997,887 | A | 12/1999 | Ha et al. |
| 5,997,890 | A | 12/1999 | Sine et al. |
| D418,708 | S | 1/2000 | Kanfer et al. |
| 6,022,551 | A | 2/2000 | Jampani et al. |
| 6,024,942 | A | 2/2000 | Tanner et al. |
| D422,828 | S | 4/2000 | Kanfer et al. |
| 6,046,152 | A | 4/2000 | Vinson et al. |
| 6,065,639 | A | 5/2000 | Maddox et al. |
| 6,087,309 | A | 7/2000 | Vinson et al. |
| 6,090,395 | A | 7/2000 | Asmus et al. |
| 6,130,253 | A | 10/2000 | Franklin et al. |
| 6,149,925 | A | 11/2000 | Mammone et al. |
| 6,183,766 | B1 | 2/2001 | Sine et al. |
| 6,217,885 | B1 | 4/2001 | Röder et al. |
| 6,224,888 | B1 | 5/2001 | Vatter et al. |
| 6,239,093 | B1 | 5/2001 | Foley et al. |
| 6,265,363 | B1 | 7/2001 | Viscovitz |
| 6,267,976 | B1 | 7/2001 | Barnhart et al. |
| 6,274,124 | B1 | 8/2001 | Vollhardt |
| 6,309,657 | B2 | 10/2001 | Vatter et al. |
| 6,319,958 | B1 | 11/2001 | Johnson et al. |
| 6,333,039 | B1 | 12/2001 | Fendler et al. |
| 6,344,218 | B1 | 2/2002 | Dodd et al. |
| 6,352,701 | B1 | 3/2002 | Scholz et al. |
| 6,383,505 | B1 | 5/2002 | Kaiser et al. |
| 6,383,997 | B1 | 5/2002 | McManus |
| 6,423,329 | B1 | 7/2002 | Sine et al. |
| 6,432,430 | B1 | 8/2002 | Fitzjarrell |
| 6,462,010 | B1 * | 10/2002 | Aszman .................. C11D 1/83 510/424 |
| 6,528,070 | B1 | 3/2003 | Bratescu et al. |
| 6,534,069 | B1 | 3/2003 | Asmus et al. |
| 6,592,880 | B1 | 7/2003 | Jager |
| 6,607,737 | B2 | 8/2003 | Bekele et al. |
| 6,613,341 | B2 | 9/2003 | Motley et al. |
| 6,623,744 | B2 | 9/2003 | Asmus et al. |
| 6,689,593 | B2 | 2/2004 | Millis et al. |
| 6,706,679 | B1 | 3/2004 | Bergeron et al. |
| 6,709,647 | B2 | 3/2004 | Bhakoo et al. |
| 6,723,689 | B1 | 4/2004 | Hoang et al. |
| 6,846,846 | B2 | 1/2005 | Modak et al. |
| 6,903,064 | B1 | 6/2005 | Kasturi et al. |
| 6,939,552 | B2 | 9/2005 | Ansara et al. |
| 6,977,082 | B2 | 12/2005 | Seitz, Jr. et al. |
| 6,979,468 | B1 | 12/2005 | Pollard |
| 7,081,246 | B2 | 7/2006 | Asmus et al. |
| 7,166,435 | B2 | 1/2007 | Rosenbloom |
| 7,199,090 | B2 | 4/2007 | Koivisto et al. |
| 7,465,697 | B1 | 12/2008 | DeAth |
| 7,560,422 | B2 | 7/2009 | Shapiro |
| 7,569,530 | B1 | 8/2009 | Pan et al. |
| 7,612,115 | B2 | 11/2009 | Suzuki et al. |
| 7,651,990 | B2 | 1/2010 | Asmus |
| 7,795,196 | B2 | 9/2010 | Luu et al. |
| 7,803,390 | B2 | 9/2010 | Asmus et al. |
| 7,842,725 | B2 | 11/2010 | Wegner et al. |
| 7,914,774 | B2 | 3/2011 | Meehan |
| 8,058,315 | B2 | 11/2011 | Wegner et al. |
| 8,106,094 | B2 | 1/2012 | Sah et al. |

(56) References Cited

U.S. PATENT DOCUMENTS

| | | | |
|---|---|---|---|
| 8,119,698 | B2 | 2/2012 | Polonka et al. |
| 8,263,098 | B2 | 9/2012 | Fernandez de Castro et al. |
| 8,309,111 | B2 | 11/2012 | Fernandez de Castro et al. |
| 8,313,758 | B2 | 11/2012 | Fernandez de Castro et al. |
| 8,333,954 | B2 | 12/2012 | Seidling et al. |
| 8,383,686 | B2 | 2/2013 | Wegner et al. |
| 8,530,524 | B2 | 9/2013 | Wegner et al. |
| 8,658,701 | B2 | 2/2014 | Wegner et al. |
| 8,940,797 | B2 | 1/2015 | Wegner et al. |
| 9,414,586 | B2 | 8/2016 | Wegner et al. |
| 2002/0022660 | A1 | 2/2002 | Jampani et al. |
| 2002/0168329 | A1 | 11/2002 | Kini et al. |
| 2003/0023550 | A1 | 1/2003 | Lee |
| 2003/0049212 | A1 | 3/2003 | Robinson et al. |
| 2003/0147925 | A1 | 8/2003 | Sawan et al. |
| 2003/0194447 | A1 | 10/2003 | Scholz et al. |
| 2003/0203452 | A1 | 10/2003 | Li et al. |
| 2003/0211066 | A1 | 11/2003 | Scholz et al. |
| 2003/0215418 | A1 | 11/2003 | Asmus et al. |
| 2004/0001797 | A1 | 1/2004 | Saud et al. |
| 2004/0102429 | A1 | 5/2004 | Modak et al. |
| 2004/0191274 | A1 | 9/2004 | Grayson et al. |
| 2004/0247685 | A1 | 12/2004 | Modak et al. |
| 2005/0053593 | A1 | 3/2005 | Wang et al. |
| 2005/0058673 | A1 | 3/2005 | Scholz et al. |
| 2005/0089539 | A1 | 4/2005 | Scholz et al. |
| 2005/0102266 | A1 | 5/2005 | Nason et al. |
| 2005/0142079 | A1 | 6/2005 | Garrison et al. |
| 2005/0148059 | A1 | 7/2005 | Estell et al. |
| 2006/0014750 | A1 | 1/2006 | O'Donnell et al. |
| 2006/0035807 | A1 | 2/2006 | Kasturi et al. |
| 2006/0051384 | A1 | 3/2006 | Scholz et al. |
| 2006/0062832 | A1 | 3/2006 | Lopes |
| 2006/0094387 | A1 | 5/2006 | Darabi |
| 2006/0104911 | A1 | 5/2006 | Novak |
| 2006/0104919 | A1 | 5/2006 | Novak |
| 2006/0177511 | A1 | 8/2006 | Scholz et al. |
| 2006/0182690 | A1 | 8/2006 | Veeger et al. |
| 2006/0193745 | A1 | 8/2006 | Arndt et al. |
| 2006/0193789 | A1 | 8/2006 | Tamarkin et al. |
| 2006/0221103 | A1 | 10/2006 | Takanose et al. |
| 2006/0222502 | A1 | 10/2006 | Hansen et al. |
| 2006/0229364 | A1 | 10/2006 | Hobbs et al. |
| 2006/0235798 | A1 | 10/2006 | Alkove et al. |
| 2006/0281663 | A1 | 12/2006 | Asmus |
| 2007/0027055 | A1 | 2/2007 | Koivisto et al. |
| 2007/0065383 | A1 | 3/2007 | Fernandez de Castro et al. |
| 2007/0076125 | A1 | 4/2007 | Choi et al. |
| 2007/0148101 | A1 | 6/2007 | Snyder et al. |
| 2007/0179207 | A1 | 8/2007 | Fernandez de Castro et al. |
| 2007/0184013 | A1 | 8/2007 | Snyder et al. |
| 2007/0184016 | A1 | 8/2007 | Macinga et al. |
| 2007/0185216 | A1 | 8/2007 | Snyder et al. |
| 2007/0190177 | A1 | 8/2007 | Kling et al. |
| 2007/0237807 | A1 | 10/2007 | Luu et al. |
| 2007/0258911 | A1 | 11/2007 | Fernandez de Castro et al. |
| 2007/0274926 | A1 | 11/2007 | Fuls et al. |
| 2007/0274940 | A1 | 11/2007 | Fuls et al. |
| 2007/0275929 | A1 | 11/2007 | Fuls et al. |
| 2007/0280900 | A1 | 12/2007 | Fox et al. |
| 2007/0280901 | A1 | 12/2007 | Fuls et al. |
| 2007/0281039 | A1 | 12/2007 | DeAth |
| 2007/0281999 | A1 | 12/2007 | Fox et al. |
| 2008/0004449 | A1 | 1/2008 | Yong et al. |
| 2008/0026974 | A1 | 1/2008 | Barnhart et al. |
| 2008/0044479 | A1 | 2/2008 | Stack |
| 2008/0095814 | A1 | 4/2008 | Taylor et al. |
| 2008/0108704 | A1 | 5/2008 | Asmus et al. |
| 2008/0121355 | A1 | 5/2008 | Pylkki et al. |
| 2008/0138438 | A1 | 6/2008 | Taylor et al. |
| 2008/0139656 | A1 | 6/2008 | Taylor et al. |
| 2008/0142023 | A1 | 6/2008 | Schmid et al. |
| 2008/0145390 | A1 | 6/2008 | Taylor et al. |
| 2008/0199535 | A1 | 8/2008 | Taylor et al. |
| 2008/0200890 | A1 | 8/2008 | Wood et al. |
| 2008/0207767 | A1 | 8/2008 | Dobos et al. |
| 2008/0213198 | A1 | 9/2008 | Lintner et al. |
| 2008/0213595 | A1 | 9/2008 | Levitt et al. |
| 2008/0249187 | A1 | 10/2008 | Ali et al. |
| 2008/0254150 | A1 | 10/2008 | Rheins et al. |
| 2008/0286223 | A1 | 11/2008 | Fuls et al. |
| 2008/0287538 | A1 | 11/2008 | Scholz et al. |
| 2009/0009806 | A1 | 1/2009 | Matsuda |
| 2009/0012174 | A1 | 1/2009 | Seitz, Jr. et al. |
| 2009/0018213 | A1 | 1/2009 | Snyder et al. |
| 2009/0023890 | A1 | 1/2009 | Monahan et al. |
| 2009/0046116 | A1 | 2/2009 | Davies et al. |
| 2009/0062176 | A1 | 3/2009 | Seidling et al. |
| 2009/0095821 | A1 | 4/2009 | Feriani et al. |
| 2009/0104281 | A1 | 4/2009 | Taylor et al. |
| 2009/0117061 | A1 | 5/2009 | Gross |
| 2009/0191248 | A1 | 7/2009 | Hoffman et al. |
| 2009/0202463 | A1 | 8/2009 | Pan et al. |
| 2009/0214628 | A1 | 8/2009 | de Rijk |
| 2009/0226541 | A1 | 9/2009 | Scholz et al. |
| 2009/0252775 | A1 | 10/2009 | Arndt et al. |
| 2009/0265230 | A1 | 10/2009 | Plachouras et al. |
| 2009/0281021 | A1 | 11/2009 | Venkataraman et al. |
| 2009/0304812 | A1 | 12/2009 | Staniforth et al. |
| 2009/0324661 | A1 | 12/2009 | Polonka et al. |
| 2009/0326076 | A1 | 12/2009 | Asmus |
| 2010/0003198 | A1 | 1/2010 | Stolmeier et al. |
| 2010/0022654 | A1 | 1/2010 | Asmus et al. |
| 2010/0029780 | A1 | 2/2010 | Grayson et al. |
| 2010/0069505 | A1 | 3/2010 | Veeger et al. |
| 2010/0124280 | A1 | 5/2010 | Chujoh et al. |
| 2010/0160453 | A1 | 6/2010 | Koivisto et al. |
| 2010/0204323 | A1 | 8/2010 | Theiler et al. |
| 2010/0282409 | A1 | 11/2010 | Hobbs et al. |
| 2010/0305211 | A1 | 12/2010 | Modak et al. |
| 2010/0317743 | A1 | 12/2010 | Macinga et al. |
| 2010/0327013 | A1 | 12/2010 | Asmus |
| 2010/0331411 | A1 | 12/2010 | Asmus |
| 2010/0331422 | A1 | 12/2010 | Asmus et al. |
| 2011/0104079 | A1 | 5/2011 | Snyder et al. |
| 2011/0110869 | A1 | 5/2011 | Scholz et al. |
| 2011/0144214 | A1 | 6/2011 | Snyder et al. |
| 2011/0224144 | A1 | 9/2011 | Akil et al. |
| 2011/0230395 | A1 | 9/2011 | Otto et al. |
| 2011/0274770 | A1 | 11/2011 | Scholz et al. |
| 2012/0011468 | A1 | 1/2012 | Zhang |
| 2012/0053108 | A1 | 3/2012 | Glenn, Jr. et al. |
| 2012/0121725 | A1 | 5/2012 | Garnier et al. |
| 2012/0164087 | A1 | 6/2012 | Carter |
| 2012/0189684 | A1 | 7/2012 | Buckley et al. |
| 2012/0208894 | A1 | 8/2012 | Kampf et al. |
| 2013/0303725 | A1 | 11/2013 | Dobrawa et al. |
| 2014/0148374 | A1 | 5/2014 | Man et al. |
| 2014/0332562 | A1 | 11/2014 | Seidling et al. |
| 2014/0364509 | A1 | 12/2014 | Wegner et al. |
| 2015/0203443 | A1 | 7/2015 | Klostermann et al. |
| 2016/0015031 | A1 | 1/2016 | Pesaro et al. |
| 2016/0346178 | A1 | 12/2016 | Wegner et al. |
| 2020/0131453 | A1 | 4/2020 | Dahlquist Howlett et al. |

FOREIGN PATENT DOCUMENTS

| | | | | |
|---|---|---|---|---|
| EP | 0396442 | A1 | 11/1990 | |
| EP | 0849070 | A1 | 6/1998 | |
| EP | 0882446 | A1 | 12/1998 | |
| EP | 0888434 | B1 | 1/1999 | |
| EP | 1557160 | A1 | 7/2005 | |
| EP | 1811013 | B1 | 7/2007 | |
| EP | 2412791 | A1 | 2/2012 | |
| EP | 2851416 | B1 | 3/2015 | |
| EP | 3292757 | A1 | 3/2018 | |
| GB | 2516261 | A | 1/2015 | |
| JP | 3179098 | A | 8/1991 | |
| JP | H03204809 | A | 9/1991 | |
| JP | 748245 | A | 2/1995 | |
| JP | 7179332 | A | 7/1995 | |
| JP | 07206634 | * | 8/1995 | ............... A61K 7/02 |
| JP | 7206634 | A | 8/1995 | |
| JP | H10167938 | A | 6/1998 | |

(56) References Cited

FOREIGN PATENT DOCUMENTS

| | | | | | |
|---|---|---|---|---|---|
| JP | 2003012466 | A | | 1/2003 | |
| JP | 2018002683 | A | | 1/2018 | |
| JP | 2018008934 | A | | 1/2018 | |
| KR | 101366211 | B1 | | 2/2014 | |
| WO | 0135905 | A2 | | 5/2001 | |
| WO | 2003076117 | A1 | | 9/2003 | |
| WO | 2003084486 | A1 | | 10/2003 | |
| WO | 2003095600 | A1 | | 11/2003 | |
| WO | 2005051341 | A3 | | 6/2005 | |
| WO | 2006038019 | A1 | | 4/2006 | |
| WO | 2006094387 | A1 | | 9/2006 | |
| WO | 2006138111 | A1 | | 12/2006 | |
| WO | 2009027867 | A3 | | 3/2009 | |
| WO | 2011123727 | A2 | | 10/2011 | |
| WO | 2013124784 | A1 | | 8/2013 | |
| WO | 2015061552 | A1 | | 4/2015 | |
| WO | 2016085906 | A1 | | 6/2016 | |
| WO | 2017199004 | A1 | | 11/2017 | |
| WO | WO 2019/194947 | | * | 10/2019 | ............... C11D 3/18 |

OTHER PUBLICATIONS

Siltech Corporation, "Innovative Silicone Specialties," Siltech, 2008, Product Brochure, 20 pages.

Siltech Corporation, "Silsurf® Di-2012," Siltech, Dec. 2009, Technical Data Sheet, 1 page.

International Searching Authority in connection with PCT/US2021/040506 filed Jul. 6, 2021, "The International Search Report and the Written Opinion of the International Searching Authority, or the Declaration", 15 pages, mailed Nov. 4, 2021.

International Searching Authority in connection with PCT/US2021/040531 filed Jul. 6, 2021, "The International Search Report and the Written Opinion of the International Searching Authority, or the Declaration", 11 pages, mailed Oct. 19, 2021.

Bergfeld, Wilma F., et al., "Safety Assessment of Alkoxy Polysiloxanes as Used in Cosmetics", Draft Report for Panel Review, 235 pages, 2014.

Brehm-Stecher, Johnson, "Sensitization of *Staphylococcus aureus* and *Escherichia coli* to Antibiotics by the Sesquiterpenoids Nerolidol, Farnesol, Bisabolol, and Apritone", American Society for Microbiology, Antimicrobial Agents and Chemotherapy, vol. 47, No. 10, pp. 3357-3360, Oct. 2003.

Cosmocil (TM) Folder, 5 pages, Jun. 9, 2014.

Intrinsic Activity of Cosmocil CQ, Avecia, 2 pages, Jun. 9, 2014.

Morton, H., "The relationship of concentration and germicidal efficiency of ethyl alcohol", Annals of the New York Academy of Sciences, vol. 52, XP008066591, pp. 191-196, Dec. 31, 1950.

Australian Government, "Patent Examination Report No. 1", issued in connection with Patent Application 2009275235, 4 pages, mailed Oct. 29, 2014.

Australian Government, "Patent Examination Report No. 2", issued in connection with Patent Application No. 2009275235, 4 pages, mailed Feb. 27, 2015.

O'Lenick, Tony, "Bis-PEG vs. PEG dimethicone", Cosmetics and Toiletries, http://www.cosmeticsandtoiletries.com/research/chemistry/7847427, 2 pages, 2007.

PEL-SIL™ bis-PEG-12 Datasheet, Ele Corporation, 3 pages, Oct. 10, 2019.

Schloss Man, M. (Ed.): "The chemistry and manufacture of cosmetics: Formulating, vol. 2, Ed. 3", Allured Pub., USA 277870, XP002390779, pp. 237-239, Dec. 31, 2000.

European Patent Office, "Supplementary European Search Report", issued in connection with Application No. /Patent No. 11796409.8-1354 / 2802636 PCT/US20211040626, 7 pages, mailed Dec. 9, 2014.

Technical Information from BASF for Bisabolol, 8 pages, Nov. 20, 2002.

Technical Specification for Farnesol, Symrise, 2 pages, Jun. 1, 2004.

Worldwide Healthcare, Inc., "Material Safety Data Sheet", 2 pages, Jan. 24, 2007.

* cited by examiner

PEG-MODIFIED CASTOR OIL BASED COMPOSITIONS FOR MICROEMULSIFYING AND REMOVING MULTIPLE OILY SOILS

CROSS-REFERENCE TO RELATED APPLICATION

This application claims priority under 35 U.S.C. § 119 to Provisional Application U.S. Ser. No. 62/705,588, filed on Jul. 6, 2020, which is herein incorporated by reference in its entirety including without limitation, the specification, claims, and abstract, as well as any figures, tables, or examples thereof.

FIELD

The disclosure relates to cleaning compositions and methods of use which employ polyethylene glycol (PEG)-modified triglycerides. These PEG-modified triglycerides have many benefits including the ease of formation of microemulsions, phase stability, low viscoelasticity, the ability to remove oily soils including other triglyceride soils and silicone soils, and to work across a range of temperatures.

BACKGROUND

Surfactants reduce the surface tension of water by adsorbing at the liquid-gas interface. They also reduce the interfacial tension between oil and water by adsorbing at the liquid-liquid interface. Surfactants are a primary component of most detergents and rinse aids. When dissolved in water, surfactants give a product the ability to remove dirt from surfaces. Each surfactant molecule has a hydrophilic head that is attracted to water molecules and a hydrophobic tail that repels water and simultaneously attaches itself to oil and grease in dirt. These opposing forces loosen the dirt and suspend it in the water.

Surfactants do the basic work of detergents and cleaning compositions by breaking up stains and keeping the dirt in the water solution to prevent re-deposition of the dirt onto the surface from which it has just been removed. Surfactants disperse, and in some cases, suspend dirt that normally does not dissolve in water and, in the case of rinse aids strip left over grease, allow the suspended dirt to be washed away, and provide wetting and sheeting action to promote faster drying.

Nonylphenol ethoxylates (NPEs) are predominantly used as industrial and domestic detergents as a surfactant. However, while effective, NPEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods.

An alternative to NPEs are alcohol ethoxylates (AEs). These alternatives are less toxic and degrade more quickly in the environment. However, it has recently been found that textiles washed with NPE free and phosphorous free detergents containing AEs smoke when exposed to high heat, e.g., in a steam tunnel in industrial laundry processes, or when ironed.

Surfactants are often incorporated in a cleaning composition to clean soiled surfaces. One of the preferred mechanisms is by microemulsifying these soils. Surfactants are also often incorporated into an oil-in-water microemulsion to make oil containing products appear more homogenous. These oil containing products include a variety of different surfactant systems in 5-20% solubilized oil which may be used as is or are then diluted with water prior to use. Examples of these oil containing products include cosmetics products containing oil for skin protection and cleaning products containing oily solvents for degreasing such as terpene and other water immiscible solvents. The surfactant systems generally employed in these cleaning products include a mixture of anionic or non-ionic surfactants and a short chain alcohol to help solubilize the oil phase and prevent liquid crystal formation. While short chain alcohols are effective, they also contribute to the volatile organic solvent content (VOC) of the product and pose flammability problems.

Many surfactant systems have also employed extended surfactant systems capable of forming microemulsions with triglyceride soils. However, due to the combination of a branched alkyl chain and the number of moles of propylene oxide typically found in the most effect of the extended surfactants, they are not readily biodegradable.

As can be seen there is a continuing need to develop effective, environmentally friendly, and safe surfactants and surfactant systems that can be used in cleaners of all kinds. This is particularly so in light of several new cleaning challenges that have emerged.

Health authorities have recently recommended that trans fats be reduced or eliminated in diets because they present health risks. In response, the food industry has largely replaced the use of trans fats with non-trans fats. These types of non-trans fats are the most difficult to remove from surfaces. The food industry and textile cleaning industry have also experienced an unexplained higher frequency of laundry fires. Textile items such as rags that are not effectively washed to better remove non-trans fats, are prone to cause fire due their substantial heat of polymerization of the trans fats. Non-trans fats have conjugated double bonds that can polymerize, and the substantial heat of polymerization involved can cause fire, for example, in a pile of rags used to mop up these non-trans fat soils.

As can be seen, there is a need in the industry for improvement of cleaning compositions, such as hard surface cleaners, rinse aids and laundry detergents and specifically the surfactants used therein so that difficult soils can be removed in a safe environmentally friendly and effective manner.

SUMMARY

The disclosure meets the needs above by providing cleaning compositions, rinse aids and the like including PEG-modified triglycerides. The mixtures form stable microemulsions with oils and fatty acids which can be the resultant product, such as lubricants, sunscreens, or triglyceride-based products. The mixtures also improve the ease of formation of microemulsions, as well with resultant microemulsions that are non-gelling, have low viscosity and superwetting properties. According to the disclosure these emulsions or microemulsions are stable, irreversible, and can be created at low temperature, for example, room temperature. These can be used in detergents, rinse aids and the like and form microemulsions without the need for linker or other cosurfactants.

In other embodiments the compositions can be used in a cleaning or rinse aid composition to emulsify, and microemulsify oils and greasy soils, such as non-trans fats and fatty acids, and remove them from substrates/surfaces. The PEG-modified triglycerides can be used alone as a pretreatment, or as a part of a cleaning composition such as a laundry detergent, rinse aid, hard surface cleaner or other emulsion or microemulsion.

The disclosure has many uses and applications, which include but are not limited to laundry cleaning, reduction of laundry fires due to non-trans fats, hard surface cleaning such as manual pot-n-pan cleaning, machine warewashing (pretreatment, detergent or rinse aid), all-purpose cleaning, floor cleaning, CIP cleaning, open facility cleaning, foam cleaning, vehicle cleaning, etc. The disclosure is also relevant to non-cleaning related uses and applications such as dry lubes, tire dressings, polishes, etc. as well as triglyceride-based lotions, suntan lotions, potentially pharmaceutical emulsions and microemulsions.

The compositions based on one or more polyethylene glycol (PEG) modified triglyceride, and notably while they may be combined, do not need to be combined co-surfactants. These triglycerides are highly effective at creating microemulsions with fatty acids and non-trans fats in broad temperature ranges and the use of various co-surfactants can be adjusted to form emulsions at different temperatures to allow one to design specific formulations specific to a particular use. The surfactant systems can be used in formulations for laundry detergents, warewash detergents, rinse aids, hard surface cleaners, whether alkali or acid based or even by as a pre-spotting/pre-soaking or rinsing agent.

According to the disclosure, certain PEG modified triglycerides can be used as a rinse agent/de-foaming package to provide wetting plus stripping of oil. These can also form microemulsions without the need of linker or additional cosurfactants. PEG modified triglyceride surfactants include those of the general formula:

$$R^1CO_2(CH_2CH_2O)_lCH_2CH(OCH_2CH_2)_m(O_2CR^2)CH_2(CH_2CH_2O)_nCO_2R^3$$

Where $R^1$, $R^2$, and $R^3$ are the same or different lipophilic moiety, a linear or branched, saturated or unsaturated, substituted or unsubstituted, aliphatic or aromatic hydrocarbon radical having from about 8 to 30 carbon atoms; and l, m, and n are the same or different number of moles of PEG, having from about 1 to 100 moles.

The mixtures form stable microemulsions with oils and fatty acids which can be the resultant product, such as lubricants, sunscreens, or triglyceride based products. According to the disclosure these emulsions or microemulsions are stable, irreversible, and can be created at low temperature, for example, room temperature.

In another embodiment the surfactant system or mixture can be used in a cleaning composition to emulsify and precipitate oils and greasy soils, such as non-trans fats and fatty acids. The surfactant system can be used alone as a pretreatment, or as a part of a cleaning composition such as a laundry detergent, hard surface cleaner or other emulsion or microemulsion.

In a further aspect of the present disclosure, a laundry detergent composition is provided which includes PEG modified, and other detergent components such as builders, enzymes and the like. The laundry detergent product being adapted according to the disclosure to readily dissolve and disperse non-trans fats in commercial, industrial and personal laundry washing processes or in a pre-spotting treatment.

These and other objects, features and attendant advantages of the present disclosure will become apparent to those skilled in the art from a reading of the following detailed description of the preferred embodiment and the appended claims.

DETAILED DESCRIPTION

Figure 1:
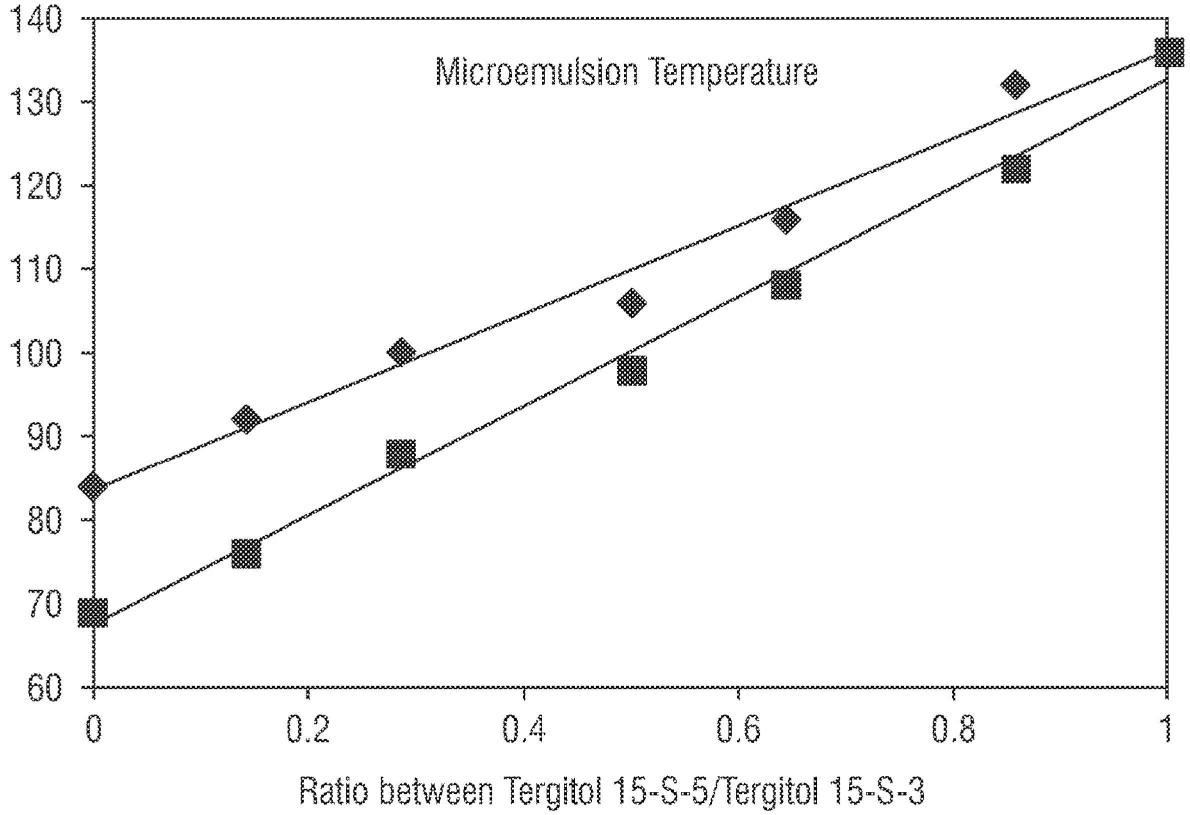
FIG. 1 shows a graphical representation representing the results of altering co-surfactants microemulsions may be made at various temperatures.

The embodiments of this disclosure are not limited to particular applications of use for the inventive surfactant systems, which can vary and are understood by skilled artisans. It is further to be understood that all terminology used herein is for the purpose of describing particular embodiments only and is not intended to be limiting in any manner or scope. For example, as used in this specification and the appended claims, the singular forms “a,” “an” and “the” can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term “about,” as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term “about” also encompasses amounts that differ due to different equilibrium conditions for a composition resulting from a particular initial mixture. Whether or not modified by the term “about”, the claims include equivalents to the quantities.

The term “actives” or “percent actives” or “percent by weight actives” or “actives concentration” are used interchangeably herein and refers to the concentration of those ingredients involved in cleaning expressed as a percentage minus inert ingredients such as water or salts.

An "antiredeposition agent" refers to a compound that helps keep suspended in water instead of redepositing onto the object being cleaned. Antiredeposition agents are useful in the present disclosure to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "cleaning composition" includes, unless otherwise indicated, detergent compositions, laundry cleaning compositions, hard surface cleaning compositions, including pretreatments or rinse aids, and personal care cleaning compositions for use in the health and beauty area. Cleaning compositions include granular, powder, liquid, gel, paste, bar form and/or flake type cleaning agents, laundry detergent cleaning agents, laundry soak or spray treatments, fabric treatment compositions, dish washing detergents and soaps, shampoos, body washes and soaps, and other similar cleaning compositions. As used herein, the term "fabric treatment composition" includes, unless otherwise indicated, fabric softening compositions, fabric enhancing compositions, fabric freshening compositions and combinations thereof. Such compositions may be, but need not be, rinse added compositions.

The term "electrolyte" refers to a substance that will provide ionic conductivity when dissolved in water or when in contact with it; such compounds may either be solid or liquid. As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces, instruments and the like.

The term "soft surface" refers to a softer, highly flexible material such as fabric, carpet, hair, and skin.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated.

Exemplary treated fibers include those treated for flame retardancy. It should be understood that the term "linen" is often used to describe certain types of laundry items including bed sheets, pillow cases, towels, table linen, table cloth, bar mops and uniforms. The disclosure additionally provides a composition and method for treating non-laundry articles and surfaces including hard surfaces such as dishes, glasses, and other wares.

As used herein, the term "microemulsion" refers to thermodynamically stable, isotropic dispersions consisting of nanometer size domains of water and/or oil stabilized by an interfacial film of surface-active agent characterized by ultra-low interfacial tension.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. More preferably, the amount of phosphate is less than 0.1 wt %, and most preferably, the amount of phosphate is less than 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt %, and most preferably the amount of phosphorus is less than 0.01 wt %.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

"Soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt %. In another embodiment, the amount of the component is less than 0.1 wt % and in yet another embodiment, the amount of component is less than 0.01 wt %, less than 0.001 wt %, or less than 0.0001 wt %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term “surfactant” as used herein is a compound that contains a lipophilic segment and a hydrophilic segment, which when added to water or solvents, reduces the surface tension of the system. The lipophilic and hydrophilic segments of a surfactant are sufficiently large enough to cause spontaneous self-aggregation.

The term “hydrotrope” as used herein is a compound that solubilizes a hydrophobic compound in an aqueous solution. A hydrotrope generally has a hydrophilic region and a hydrophobic region that are too small to cause spontaneous self-aggregation. As such, hydrotropes, unlike surfactants, generally lack a critical micelle concentration or a critical vesicle concentration.

As used herein, the term “ware” refers to items such as eating and cooking utensils, dishes, and other hard surfaces such as showers, sinks, toilets, bathtubs, countertops, windows, mirrors, transportation vehicles, and floors. As used herein, the term “warewashing” refers to washing, cleaning, or rinsing ware. Ware also refers to items made of plastic. Types of plastics that can be cleaned with the compositions according to the disclosure include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the disclosure include polyethylene terephthalate (PET) and polystyrene polyamide.

The term “weight percent,” “wt.-%,” “percent by weight,” “% by weight,” and variations thereof, as used herein, refer to the concentration of a substance as the weight of that substance divided by the total weight of the composition and multiplied by 100. It is understood that, as used here, “percent,” “%,” and the like are intended to be synonymous with “weight percent,” “wt.-%,” etc.

The methods and compositions of the present disclosure may comprise, consist essentially of, or consist of the components and ingredients of the present disclosure as well as other ingredients described herein. As used herein, “consisting essentially of” means that the methods and compositions may include additional steps, components or ingredients, but only if the additional steps, components or ingredients do not materially alter the basic and novel characteristics of the claimed methods and compositions.

PEG Modified Triglycerides

Triglycerides include compounds which have three hydrophilic heads paired with three hydrophobic tails in which the three hydrophilic heads are bound together by ether bonds with glycerol in the closed end. The hydrophobic tails may comprise of any branched or linear, substituted or unsubstituted, or saturated or unsaturated fatty acid. The PEG-modified triglycerides have the ethylene oxide (EO) groups inserted between the glyceryl and fatty acid components. The EO groups may be substituted with either propylene oxide (PO) or butylene oxide (BO) groups, and/or combinations thereof. Tryglycerdies useful can include olive oil, soybean oil etc.

Castor oil, an exemplary triglyceride, is a plant-derived oil obtained from the seeds (castor beans) of the plant *Ricinus communis*. It is a mixture of triglycerides composed of several different fatty acids. It is a mono-unsaturated fat, with a one double carbon-carbon bond per arm of the triglyceride. The major component is ricinoleic acid, with the remainder of the oil being comprised of oleic, linoleic, stearic, and several other organic acids.

The chemistry of the major component of ricinoleic acid is distinct among triglycerides. This fatty acid possesses hydroxyl (—OH) groups on each arm of the molecule, which make it more polar than other fatty acids. The hydroxyl group also facilitates chemical modification of the triglyceride, allowing creation of derivatives with desired properties for many different applications.

One such derivative, is PEG-x castor oil (x=number of ethylene glycol units). Ricinoleic acid (castor oil) reacted with ethylene oxide produces a polyethylene glycol modified castor oil, with the number of ethylene glycol units varying from as few as one to more than 100. The ethylene glycol portion of the molecule is hydrophilic (water soluble). This hydrophilic portion, coupled with the hydrophobic oil portion of the triglyceride, creates a nonionic surfactant molecule. These surfactant molecules can be used by formulators as excellent emulsifiers of conditioning agents, stabilizers, and thickeners. The ethylene glycol groups enhance the humectant properties of the castor oil molecule. PEG-castor oil molecules range from dispersible in aqueous solutions to completely water soluble, depending upon the PEG-#. When the PEG-# exceeds approximately 35, the molecule becomes completely water soluble.

The PEG modified castor oil for use in embodiments of the disclosure include those of the general formula:

$$R^1CO_2(CH_2CH_2O)_lCH_2CH(OCH_2CH_2)_m(O_2CR^2)$$
$$CH_2(CH_2CH_2O)_nCO_2R^3$$

Where $R^1$, $R^2$, and $R^3$ are the same or different lipophilic moiety, a linear or branched, saturated or unsaturated, substituted or unsubstituted, aliphatic or aromatic hydrocarbon radical having from about 8 to 30 carbon atoms; and l, m, and n are the same or different number of moles of PEG, having from about 1 to about 100 moles, preferably about 10 to about 80 moles, and even more preferably about 20 to about 60 moles PEG.

Without being bound by a particular theory, it is believed that the PEG-modified triglyceride acts as a classic Gemini surfactant, but whereas the classic Gemini surfactants have two hydrophilic head and hydrophobic tail pairings, the PEG-modified triglycerides have an additional head and tail pairing.

According to an embodiment, the PEG-modified triglyceride composition is employed in cleaning, rinsing, degreasing, and other formulations. The PEG-modified triglyceride compositions of the disclosure have been optimized to form stable microemulsions without the need for co-surfactants. Further, emulsions or microemulsions of different temperature range that are stable and irreversible, i.e. the emulsion or microemulsion does not revert as it stays in the specific temperature range may be created. The PEG-modified triglyceride composition of the disclosure is capable of forming emulsions or microemulsions with, or in cleaning compositions for removing or treated stains caused by oils and fatty acids including hydrocarbon type oils, vegetable oils, organic oils, mineral oils, synthetic oils, petrochemical oils, volatile essential oils, including fatty acids, lipids as well as triglycerides and silicone soils.

This feature may be used for removal of the oils in cleaning products or in any other product which requires an oil emulsion or microemulsion such as lubricants, suntan lotions, pharmaceutical applications hair products such as shampoos, gels, conditioners and the like, Petroleum products such as diesel fuel (petrodiesel), ethane (and other short-chain alkanes), fuel oils (heaviest of commercial fuels, used in ships/furnaces), gasoline (petrol), jet fuel, kerosene, and liquefied petroleum gas, lubrication products for various personal and engineering purposes, detergents, fertilizers, medicines, paints, plastics, synthetic fibers, and synthetic rubber.

Additionally, the disclosure has other uses and applications which include but are not limited to laundry cleaning, reduction of laundry fire due to non-transfats, and hard surface cleaning such as manual pot-n-pan cleaning, machine warewashing, all-purpose cleaning, floor cleaning, CIP cleaning, open facility cleaning, foam cleaning, vehicle cleaning, etc. The disclosure is also relevant to non-cleaning related uses and applications such as dry lubes, tire dressings, polishes, etc. as well as triglyceride-based lotions, suntan lotions, potentially pharmaceutical emulsions, and microemulsions.

In certain embodiments the PEG-modified triglyceride composition is part of a cleaning composition which further traditional cleaning components such as a multiply charged cation such as Mg2+, Ca2+ or other functional electrolytes such as an alkalinity source or a chelating agent. The resultant combination is highly effective at forming microemulsions with non-transfats across a range of temperatures. This system can be used in formulations for laundry detergents, hard surface cleaners, whether alkali or acid based, rinse aid, hard surface cleaner, even by itself as a prespotting agent, or other emulsion or microemulsion.

In such compositions the PEG modified castor oil may be present in the solution from about 0.05 wt % to about 50 wt %, from about 0.05 wt % to about 40 wt %, from about 0.1 wt % to about 30 wt %, or from about 0.2 wt % to about 25 wt %.

Cleaning Compositions Comprising PEG Modified Castor Oil

The modified triglycerides may be used alone, as a pre-treatment, pre-soak or pre-spot composition in combination with a traditional detergent or cleaner, or may be incorporated within a cleaning composition. The disclosure comprises both hard surface and soft surface cleaning compositions including the disclosed surfactant system.

In one embodiment, the disclosure employs the modified triglycerides or surfactant system of the disclosure, an acid source, a solvent, a water conditioning agent, and water to make a hard surface cleaner which will be effective at removing greasy and oily soils from surfaces such as showers, sinks, toilets, bathtubs, countertops, windows, mirrors, transportation vehicles, floors, and the like. These surfaces can be those typified as "hard surfaces" (such as walls, floors, or bed-pans).

Cleaning Composition Formulations

In another embodiment the invention includes a ware wash or laundry detergent which includes a builder, and other traditional components such as enzymes. Examples of such standard laundry, warewash and rinse aid components and formulations, which are well known to those skilled in the art, are provided in the following paragraphs The detergent composition can be provided in solid or liquid form and includes, for example, an alkalinity source, a metal protector (for warewash), a surfactant or surfactant system of the invention water, and a threshold agent, and other optional components. Typical formulations can include form about 30% and about 80% by weight alkalinity source, between about 15% and about 35% by weight metal protector, between about 2% and about 10% by weight surfactant, between about 0.1% and about 20% by weight water, between about 0.2% and about 15% by weight threshold agent. If a scale inhibitor is present it is present in an amount of from about 0 to about 15% by weight.

In yet another embodiment, the invention employs hard surface cleaning composition with the surfactant system of the invention, an acid source or source of alkalinity, and optionally a solvent, a water conditioning agent, and water to make a hard surface cleaner which will be effective at removing greasy and oily soils from surfaces such as showers, sinks, toilets, bathtubs, countertops, windows, mirrors, transportation vehicles, floors, and the like. These surfaces can be those typified as "hard surfaces" (such as walls, floors, bed-pans).

A typical hard surface formulation at about 18% activity includes between about 40 wt. % and about 80 wt. % surfactant system of the invention, between about 3 wt. % and about 18 wt. % water conditioning agent, between about 0.1 wt. % and about 0.55 wt. % acid or alkalinity source, between about 0 wt. % and about 10 wt. % solvent and between about 10 wt. % and about 60 wt. % water.

Particularly, the cleaning compositions include between about 45 wt. % and about 75 wt. % surfactant system of the invention, between about 0 wt. % and about 10 wt. % optional co-surfactant, between about 5 wt. % and about 15 wt. % water conditioning agent, between about 0.3 wt. % and about 0.5 wt. % acid or alkalinity source, between about 0 and about 6 wt. % solvent and between about 15 wt. % and about 50 wt. % water. In other embodiments, similar intermediate concentrations and use concentrations may also be present in the cleaning compositions of the invention.

The booster or surfactant system of the invention may be used alone, as a pre-spot or pre-treatment composition in combination with a traditional detergent or cleaner, or may be incorporated within a cleaning composition. The invention comprises both hard surface and soft surface cleaning compositions employing the disclosed surfactant and/or booster system.

In one embodiment, the invention employs the surfactant system of the invention, an acid source, a solvent, a water conditioning agent, and water to make a hard surface cleaner which will be effective at removing greasy and oily soils from surfaces such as showers, sinks, toilets, bathtubs, countertops, windows, minors, transportation vehicles, floors, and the like. These surfaces can be those typified as "hard surfaces" (such as walls, floors, bed-pans).

A typical hard surface formulation at about 18% activity includes between about 40 wt. % and about 80 wt. % surfactant system of the invention, between about 3 wt. % and about 18 wt. % water conditioning agent, between about 0.1 wt. % and about 0.55 wt. % acid source, between about 0 wt % and about 10 wt. % solvent and between about 10 wt. % and about 60 wt. % water. Particularly, the cleaning compositions include between about 45 wt. % and about 75 wt. % surfactant system of the invention, between about 0 wt. % and about 10 wt. % optional co-surfactant, between about 5 wt. % and about 15 wt. % water conditioning agent, between about 0.3 wt. % and about 0.5 wt. % acid source, between about 0 and about 6 wt. % solvent and between about 15 wt. % and about 50 wt. % water. In other embodiments, similar intermediate concentrations and use concentrations may also be present in the cleaning compositions of the invention.

In a laundry detergent formulation the compositions of the invention typically include the surfactant system of the invention, and a builder, optionally with an enzyme. Examples of such standard laundry detergent ingredients, which are well known to those skilled in the art, are provided in the following paragraphs. A typical hard surface formulation at about 18% activity includes between about 40 wt. % and about 80 wt. % modified triglycerides or surfactant system of the disclosure, between about 3 wt. % and about 18 wt. % water conditioning agent, between about 0.1 wt. % and about 0.55 wt. % acid source, between about 0 wt % and about 10 wt. % solvent and between about 10 wt. % and about 60 wt. % water.

Particularly, the cleaning compositions include between about 45 wt. % and about 75 wt. % modified triglycerides or surfactant system of the disclosure, between about 0 wt. % and about 10 wt. % optional co-surfactant, between about 5 wt. % and about 15 wt. % water conditioning agent, between about 0.3 wt. % and about 0.5 wt. % acid source, between about 0 and about 6 wt. % solvent and between about 15 wt. % and about 50 wt. % water. In other embodiments, similar intermediate concentrations and use concentrations may also be present in the cleaning compositions of the disclosure.

In a laundry detergent formulation the compositions of the disclosure typically include the surfactant system of the disclosure, and a builder, optionally with an enzyme. Examples of such standard laundry detergent ingredients, which are well known to those skilled in the art, are provided in the following paragraphs.

Additional Components

While not essential for the purposes of the present disclosure, the non-limiting list of additional components illustrated hereinafter are suitable for use in the instant compositions and may be desirably incorporated in certain embodiments of the disclosure, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable additional materials include, but are not limited to, surfactants, builders, chelating agents, dye transfer inhibiting agents, viscosity modifiers, dispersants, additional enzymes, and enzyme stabilizers, catalytic materials, bleaches, bleach activators, hydrogen peroxide, sources of hydrogen peroxide, preformed peracids, polymeric dispersing agents, threshold inhibitors for hard water precipitation pigments, clay soil removal/anti-redeposition agents, brighteners, suds suppressors, dyes, fabric hueing agents, perfumes, structure elasticizing agents, fabric softeners, carriers, hydrotropes, processing aids, solvents, pigments antimicrobials, pH buffers, processing aids, active fluorescent whitening ingredient, additional surfactants and mixtures thereof. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' compositions. Thus, certain embodiments of Applicants' compositions do not contain additional materials. However, when one or more additional materials are present, such one or more additional components may be present as detailed below:

The liquid detergent herein has a neat pH of from about 7 to about 13, or about 7 to about 9, or from about 7.2 to about 8.5, or from about 7.4 to about 8.2. The detergent may contain a buffer and/or a pH-adjusting agent, including inorganic and/or organic alkalinity sources and acidifying agents such as water-soluble alkali metal, and/or alkali earth metal salts of hydroxides, oxides, carbonates, bicarbonates, borates, silicates, phosphates, and/or metasilicates; or sodium hydroxide, potassium hydroxide, pyrophosphate, orthophosphate, polyphosphate, and/or phosphonate. The organic alkalinity source herein includes a primary, secondary, and/or tertiary amine. The inorganic acidifying agent herein includes HF, HCl, HBr, HI, boric acid, sulfuric acid, phosphoric acid, and/or sulphonic acid; or boric acid. The organic acidifying agent herein includes substituted and substituted, branched, linear and/or cyclic C1-30 carboxylic acid.

Bleaching Agents

The cleaning compositions of the present disclosure may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present disclosure may comprise from about 0.1% to about 50% or even from about 0.1% to about 25% bleaching agent by weight of the subject cleaning composition. Examples of suitable bleaching agents include:

(1) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C—O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(2) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the disclosure the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (3) bleach activators having R—(C—O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the disclosure the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Surfactant

In some embodiments, the compositions of the disclosure include a surfactant in combination with a PEG modified triglyceride to improve performance or to achieve cleaning or emulsion formation across specific temperatures. Surfactants can be anionic, nonionic, cationic zwitterionic. In some embodiments, extended chain surfactants may be included. In other embodiments, the compositions are essentially or completely free of extended chain surfactants.

In some embodiments, the detergent compositions disclosed herein include, in addition to the nonionic surfactant or agent, about 0 wt-% to about 50 wt-% of an additional surfactant, from about 0 wt-% to about 25 wt-%, from about 0 wt-% to about 15 wt-%, from about 0 wt-% to about 10 wt-%, or from about 0 wt-% to about 5 wt-%, about 0 wt-%, about 0.5 wt-%, about 1 wt-%, about 3 wt-%, about 5 wt-%, about 10 wt-%, or about 15 wt-% of an additional surfactant.

Nonionic Surfactant

Additional nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt %.

Other nonionic surfactants include alcohol alkoxylates. A suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the detergent composition concentrate, they can be included in an amount of at least about 0.1 wt. % and can be included in an amount of up to about 15 wt. %. The concentrate can include about 0.1 to 1.0 wt. %, about 0.5 wt. % to about 12 wt. % or about 2 wt. % to about 10 wt. % of the nonionic surfactant.

Amphoteric surfactants can also be used to provide desired detersive properties. Suitable amphoteric surfactants that can be used include, but are not limited to betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the detergent composition includes an amphoteric surfactant, the amphoteric surfactant can be included in an amount of about 0.1 wt % to about 15 wt %. The concentrate can include about 0.1 wt % to about 1.0 wt %, 0.5 wt % to about 12 wt % or about 2 wt % to about 10 wt % of the amphoteric surfactant.

The cleaning composition can contain a cationic surfactant component that includes a detersive amount of cationic surfactant or a mixture of cationic surfactants. Cationic co-surfactants that can be used in the cleaning composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride.

In some embodiments the additional surfactant may be an extended surfactant. Extended surfactants include a linker polyalkylene glycol link.

The general formula for a nonionic extended surfactant is $$R\text{-}[L]_x\text{-}[O—CH_2—CH_2]_y$$

where R is the lipophilic moiety, such as a linear or branched, saturated or unsaturated, substituted or unsubstituted, aliphatic or aromatic hydrocarbon radical having from about 8 to 20 carbon atoms, L is a linking group, such as a block of poly-alkylene oxide, preferably polypropylene oxide; x is the chain length of the linking group ranging from 2-25; and y is the average degree of ethoxylation ranging from 1-18. In a preferred embodiment, applicants have found that use of a nonionic surfactant with enough PO extension as the main surfactant (and only) can form liquid single phase microemulsions. PO length is optimized at from about 5 to about 8 moles of PO. This length of PO extension provides a lower foam profile. Applicants have further found that R groups that are a branched hydrophobe such as a guerbet alcohol are better for protein soil defoaming.

Preferred extended surfactants include: branched Guerbet alcohol alkoxylates; such as $C_y(PO)_8(EO)_x$ (x=3, 6, 8, 10) (y=10-12) also, extended linear alcohol alkoxylates; $C_{(12-14)}(PO)_{16}(EO)_x$ (x=6, 12, 17).

Branched Alcohol Alkoxylates

Preferred branched alcohol alkoxylates include Guerbet ethoxylates. Guerbet ethoxylates suitable for use herein have the following formula:

$$\underset{R^1}{CH_3(CH_2)_nCHCH_2O}(\underset{R^2}{CH_2CHO})_mH$$

In an embodiment the Guerbet ethoxylate is further defined wherein $R^1$ is C2-C20 alkyl and $R^2$ is H or C1-C4 alkyl. In a further embodiment, the Guerbet ethoxylate is defined wherein "n" is an integer between 2 and 20 and wherein "m" is an integer between 1 and 40.

In another embodiment, the branched alcohol alkoxylate is a Guerbet ethoxylate that is prepared from a Guerbet alcohol by dimerization of alkenes (e.g. butane).

The branched alcohol alkoxylates, including Guerbet ethoxylates, can be prepared according to U.S. Pat. Nos. 6,906,320, 6,737,553 and 5,977,048, the disclosure of these patents are herein incorporated by reference in their entirety. Exemplary branched alcohol alkoxylates include those available under the tradenames Lutensol XP-30 and Lutensol XP-50 (BASF Corporation). In general, Lutensol XP-30 can be considered to have 3 repeating ethoxy groups, and Lutensol XP-50 can be considered to have 5 repeating ethoxy groups.

Branched alcohol alkoxylates can be classified as relatively water insoluble or relatively water soluble. In general, a water insoluble branched alcohol alkoxylate can be considered an alkoxylate that, when provided as a composition containing 5 wt.-% of the branched alcohol alkoxylate and 95 wt.-% water, has a tendency to phase separate. Lutensol XP-30 and Lutensol XP-50 from BASF Corporation are examples of water-insoluble branched alcohol alkoxylates.

According to an embodiment, a branched alcohol alkoxylate, preferably a water-insoluble Guerbet ethoxylate has from about 10 wt.-% to about 90 wt.-% ethylene oxide, from about 20 wt.-% to about 70 wt.-% ethylene oxide preferably from about 30 wt.-% to about 60 wt.-% ethylene oxide.

Applicants have further found that use of capped extended nonionic surfactants lowers the foam profile of the composition and foam from protein soil.

Capped extended nonionic surfactants can include:

$$R—[PO]_x\text{-}[EO]_y[N]_z$$

Where N is a capping group such as an alkyl group such as methyl, benzyl, butyl, etc.; a PO group of from 1-5 length, in length. These capped nonionic surfactants have lowered foam profiles and the like are effective for rinse aid formulations and detergents.

These extended chain surfactants attain low tension and/or high solubilization, and can from a single phase microemulsion with oils, such as non-trans fats with additional beneficial properties including, but not necessarily limited to, tunability to temperature and irreversibility within the microemulsion forming temperature range. For example, in one embodiment the emulsions or microemulsions may function over a relatively wide temperature range of from about 80° to 190° C. For example with a PO length of 8, and R as a Guerbet alcohol, extended nonionic surfactants tested formed stable microemulsions for 3EO at 90°-80°; 6 EO at 160°-120°; 8EO 150°-185° and 10 EO 165°-190°. Thus one can customize the extended nonionic surfactant for the type of cleaning system used, and at what temperature one wants the micro emulsion to form.

Many extended chain anionic and nonionic surfactants are commercially available from a number of sources. These include the Plurafac and Lutensol XL series from BASF, Ecosurf series from Dow, X LA series from Huntsman, and Alfotera series from Sasol.

Anionic Surfactants

Also useful in the detergent compositions disclosed herein are surface active substances which are categorized as anionic surfactants because the charge on the hydrophobic group is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionic surfactants are excellent detersive surfactants and are therefore favored additions to heavy duty detergent compositions.

Anionic sulfate surfactants suitable for use in the claimed detergent compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the claimed detergent compositions also include alkyl sulfonates, the linear and branched primary and secondary alkyl sulfonates, and the aromatic sulfonates with or without substituents.

Anionic carboxylate surfactants suitable for use in the claimed detergent compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

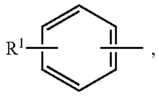

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

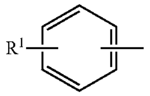

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Cationic Quaternary Surfactant/Quaternary Alkyl Amine Alkoxylate

The cationic quaternary surfactants are substances based on nitrogen centered cationic moieties with net positive change. Suitable cationic surfactants contain quaternary ammonium groups. Suitable cationic surfactants especially include those of the general formula: $N^{(+)}R^1R^2R^3R^4X^{(-)}$, wherein $R^1$, $R^2$, $R^3$ and $R^4$ independently of each other represent alkyl groups, aliphatic groups, aromatic groups, alkoxy groups, polyoxyalkylene groups, alkylamido groups, hydroxyalkyl groups, aryl groups, $H^+$ ions, each with from 1 to 22 carbon atoms, with the provision that at least one of the groups $R^1$, $R^2$, $R^3$ and $R^4$ has at least eight carbon atoms and wherein X(−) represents an anion, for example, a halogen, acetate, phosphate, nitrate or alkyl sulfate, preferably a chloride. The aliphatic groups can also contain cross-linking or other groups, for example additional amino groups, in addition to the carbon and hydrogen atoms.

Particular cationic active ingredients include, for example, but are not limited to, alkyl dimethyl benzyl ammonium chloride (ADBAC), alkyl dimethyl ethylbenzyl ammonium chloride, dialkyl dimethyl ammonium chloride, benzethonium chloride, N,N-bis-(3-aminopropyl) dodecylamine, chlorhexidine gluconate, an organic and/or organic salt of chlorhexidene gluconate, PHMB (polyhexamethylene biguanide), salt of a biguanide, a substituted biguanide derivative, an organic salt of a quaternary ammonium containing compound or an inorganic salt of a quaternary ammonium containing compound or mixtures thereof.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

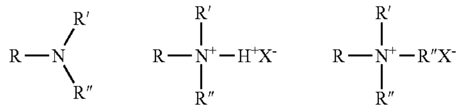

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

Preferred cationic quaternary ammonium compound can be schematically shown as:

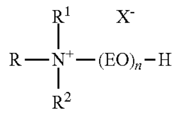

in which R represents a C8-C18 alkyl or alkenyl; $R^1$ and $R^2$ are C1-C4 alkyl groups; n is 10-25; and x is an anion selected from a halide or methyl sulfate.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the claimed detergent compositions herein include those having the formula $R^1{}_mR^2{}_xYLZ$ wherein each $R^1$ is an organic group containing a straight or branched alkyl or alkenyl group optionally substituted with up to three phenyl or hydroxy groups and optionally interrupted by up to four of the following structures:

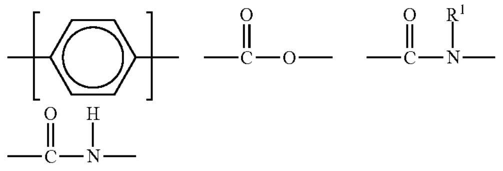

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

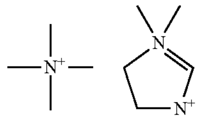

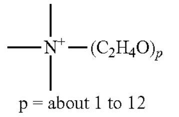

p = about 1 to 12

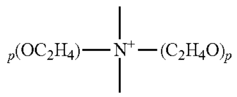

p = about 1 to 12

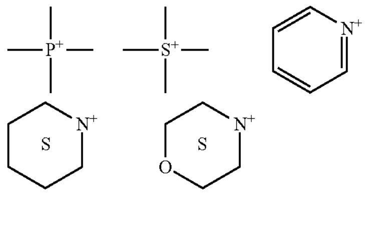

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Suitable concentrations of the cationic quaternary surfactant in the claimed detergents compositions may be between about 0% and about 10% by weight of the claimed detergent compositions.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

(MONO)ACETATE

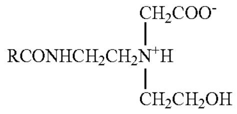

(DI)PROPIONATE

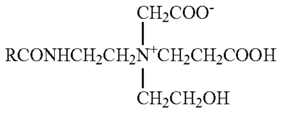

Neutral pH Zwitterion

AMPHOTERIC SULFONATE

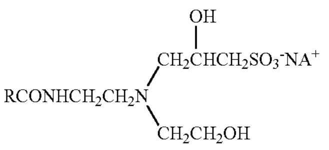

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

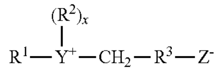

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

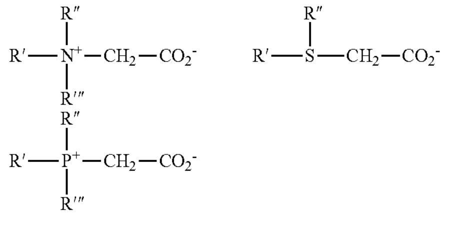

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Builders

The cleaning compositions of the present disclosure may comprise one or more detergent builders or builder systems. When a builder is used, the subject composition will typically comprise at least about 1%, from about 5% to about 60% or even from about 10% to about 40% builder by weight of the subject composition. The detergent may contain an inorganic or organic detergent builder which counteracts the effects of calcium, or other ion, water hardness. Examples include the alkali metal citrates, succinates, malonates, carboxymethyl succinates, carboxylates, polycarboxylates and polyacetyl carboxylate; or sodium, potassium and lithium salts of oxydisuccinic acid, mellitic acid, benzene polycarboxylic acids, and citric acid; or citric acid and citrate salts. Organic phosphonate type sequestering agents such as DEQUEST® by Monsanto and alkanehydroxy phosphonates are useful. Other organic builders include higher molecular weight polymers and copolymers, e.g., polyacrylic acid, polymaleic acid, and polyacrylic/polymaleic acid copolymers and their salts, such as SOKALAN® by BASF. Generally, the builder may be up to 30%, or from about 1% to about 20%, or from abut 3% to about 10%.

The compositions may also contain from about 0.01% to about 10%, or from about 2% to about 7%, or from about 3% to about 5% of a C8-20 fatty acid as a builder. The fatty acid can also contain from about 1 to about 10 EO units. Suitable fatty acids are saturated and/or unsaturated and can be obtained from natural sources such a plant or animal esters (e.g., palm kernel oil, palm oil, coconut oil, babassu oil, safflower oil, tall oil, tallow and fish oils, grease, and mixtures thereof), or synthetically prepared (e.g., via the oxidation of petroleum or by hydrogenation of carbon monoxide via the Fisher Tropsch process). Useful fatty acids are saturated C12 fatty acid, saturated C12-14 fatty acids, saturated or unsaturated C12-18 fatty acids, and a mixture thereof. Examples of suitable saturated fatty acids include captic, lauric, myristic, palmitic, stearic, arachidic and behenic acid. Suitable unsaturated fatty acids include: palmitoleic, oleic, linoleic, linolenic and ricinoleic acid.

Chelating Agents

The cleaning compositions herein may contain a chelating agent. Suitable chelating agents include copper, iron and/or manganese chelating agents and mixtures thereof. When a chelating agent is used, the subject composition may comprise from about 0.005% to about 15% or even from about 3.0% to about 10% chelating agent by weight of the subject composition.

Dye Transfer Inhibiting Agents

The cleaning compositions of the present disclosure may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Optical Brightener

In some embodiments, an optical brightener component, may be present in the compositions of the present disclosure. The optical brightener can include any brightener that is capable of eliminating graying and yellowing of fabrics. Typically, these substances attach to the fibers and bring about a brightening and simulated bleaching action by converting invisible ultraviolet radiation into visible longer-wave length light, the ultraviolet light absorbed from sunlight being irradiated as a pale bluish fluorescence and, together with the yellow shade of the grayed or yellowed laundry, producing pure white.

Fluorescent compounds belonging to the optical brightener family are typically aromatic or aromatic heterocyclic materials often containing condensed ring systems. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.).

Optical brighteners useful in the present disclosure are known and commercially available. Commercial optical brighteners which may be useful in the present disclosure can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present disclosure include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene. In an embodiment, optical brighteners include stilbene derivatives.

In some embodiments, the optical brightener includes Tinopal UNPA, which is commercially available through the Ciba Geigy Corporation located in Switzerland.

Additional optical brighteners for use in the present disclosure include, but are not limited to, the classes of substance of 4,4'-diamino-2,2'-stilbenedisulfonic acids (flavonic acids), 4,4'-distyrylbiphenyls, methylumbelliferones, coumarins, dihydroquinolinones, 1,3-diarylpyrazolines, naphthalimides, benzoxazol, benzisoxazol and benzimidazol systems, and pyrene derivatives substituted by heterocycles, and the like. Suitable optical brightener levels include lower levels of from about 0.01, from about 0.05, from about 0.1 or even from about 0.2 wt % to upper levels of 0.5 or even 0.75 wt %.

Dispersants

The compositions of the present disclosure can also contain dispersants. Suitable water-soluble organic materials include the homo- or co-polymeric acids or their salts, in which the polycarboxylic acid comprises at least two carboxyl radicals separated from each other by not more than two carbon atoms.

Enzymes

The cleaning compositions can comprise one or more enzymes which provide cleaning performance and/or fabric care benefits. Enzymes can be included herein for a wide variety of fabric laundering purposes, including removal of protein-based, carbohydrate-based, or triglyceride-based stains, for example, and/or for fabric restoration. Examples of suitable enzymes include, but are not limited to, hemicellulases, peroxidases, proteases, cellulases, xylanases, lipases, phospholipases, esterases, cutinases, pectinases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, or combinations thereof and may be of any suitable origin. The choice of enzyme(s) takes into account factors such as pH-activity, stability optima, thermostability, stability versus active detergents, chelants, builders, etc. A detersive enzyme mixture useful herein is a protease, lipase, cutinase and/or cellulase in conjunction with amylase. Sample detersive enzymes are described in U.S. Pat. No. 6,579,839.

Enzymes are normally present at up to about 5 mg, more typically from about 0.01 mg to about 3 mg by weight of active enzyme per gram of the detergent. Stated another way, the detergent herein will typically contain from about 0.001% to about 5%, or from about 0.01% to about 2%, or from about 0.05% to about 1% by weight of a commercial enzyme preparation. Protease enzymes are present at from about 0.005 to about 0.1 AU of activity per gram of detergent. Proteases useful herein include those like subtilisins from *Bacillus* [e.g. *subtilis, lentus, licheniformis, amyloliquefaciens* (BPN, BPN'), *alcalophilus*,] e.g. Esperase®, Alcalase®, Everlase® and Savinase® (Novozymes), BLAP and variants (Henkel). Further proteases are described in EP 130756, WO 91/06637, WO 95/10591 and WO 99/20726.

Amylases are described in GB Pat. #1 296 839, WO 94/02597 and WO 96/23873; and available as Purafect Ox Am® (Genencor), Termamyl®, Natalase®, Ban®, Fungamyl®, Duramyl® (all Novozymes), and RAPIDASE (International Bio-Synthetics, Inc).

The cellulase herein includes bacterial and/or fungal cellulases with a pH optimum between 5 and 9.5. Suitable cellulases are disclosed in U.S. Pat. No. 4,435,307 to Barbesgoard, et al., issued Mar. 6, 1984. Cellulases useful herein include bacterial or fungal cellulases, e.g. produced by *Humicola insolens*, particularly DSM 1800, e.g. 50 kD and ~43 kD (Carezyyme®). Additional suitable cellulases are the EGIII cellulases from *Trichoderma longibrachiatum*. WO 02/099091 by Novozymes describes an enzyme exhibiting endo-beta-glucanase activity (EC 3.2.1.4) endogenous to *Bacillus* sp., DSM 12648; for use in detergent and textile applications; and an anti-redeposition endo-glucanase in WO 04/053039. Kao's EP 265 832 describes alkaline cellulase K, CMCase I and CMCase II isolated from a culture product of *Bacillus* sp KSM-635. Kao further describes in EP 1 350 843 (KSM S237; 1139; KSM 64; KSM N131), EP 265 832A (KSM 635, FERM BP 1485) and EP 0 271 044 A (KSM 534, FERM BP 1508; KSM 539, FERM BP 1509; KSM 577, FERM BP 1510; KSM 521, FERM BP 1507; KSM 580, FERM BP 1511; KSM 588, FERM BP 1513; KSM 597, FERM BP 1514; KSM 522, FERM BP 1512; KSM 3445, FERM BP 1506; KSM 425. FERM BP 1505) readily-mass producible and high activity alkaline cellulases/endo-glucanases for an alkaline environment. Such endo-glucanase may contain a polypeptide (or variant thereof) endogenous to one of the above *Bacillus* species. Other suitable cellulases are Family 44 Glycosyl Hydrolase enzymes exhibiting endo-beta-1,4-glucanase activity from Paenibacilus polyxyma (wild-type) such as XYG1006 described in WO 01/062903 or variants thereof. Carbohydrases useful herein include e.g. mannanase (see, e.g., U.S. Pat. No. 6,060,299), pectate lyase (see, e.g., WO99/27083), cyclomaltodextrin glucanotransferase (see, e.g., WO96/33267), and/or xyloglucanase (see, e.g., WO99/02663). Bleaching enzymes useful herein with enhancers include e.g. peroxidases, laccases, oxygenases, lipoxygenase (see, e.g., WO 95/26393), and/or (non-heme) haloperoxidases.

Suitable endoglucanases include: 1) An enzyme exhibiting endo-beta-1,4-glucanase activity (E.C. 3.2.1.4), with a sequence at least 90%, or at least 94%, or at least 97% or at least 99%, or 100% identity to the amino acid sequence of positions 1-773 of SEQ ID NO:2 in WO 02/099091; or a fragment thereof that has endo-beta-1,4-glucanase activity. GAP in the GCG program determines identity using a GAP creation penalty of 3.0 and GAP extension penalty of 0.1. See WO 02/099091 by Novozymes A/S on Dec. 12, 2002, e.g., Celluclean™ by Novozymes A/S. GCG refers to sequence analysis software package (Accelrys, San Diego, Calif., USA). GCG includes a program called GAP which uses the Needleman and Wunsch algorithm to find the alignment of two complete sequences that maximizes the number of matches and minimizes the number of gaps; and 2) Alkaline endoglucanase enzymes described in EP 1 350 843A published by Kao on Oct. 8, 2003 ([0011]-[0039] and examples 1-4).

Suitable lipases include those produced by *Pseudomonas* and Chromobacter, and LIPOLASE®, LIPOLASE ULTRA®, LIPOPRIME® and LIPEX® from Novozymes. See also Japanese Patent Application 53-20487, laid open on Feb. 24, 1978, available from Areario Pharmaceutical Co. Ltd., Nagoya, Japan, under the trade name Lipase P "Amano". Other commercial lipases include Amano-CES, lipases ex Chromobacter *viscosum*, available from Toyo Jozo Co., Tagata, Japan; and Chromobacter *viscosum* lipases from U.S. Biochemical Corp., U.S.A. and Diosynth Co., The Netherlands, and lipases ex *Pseudomonas gladioli*. Also suitable are cutinases [EC 3.1.1.50] and esterases.

Enzymes useful for liquid detergent formulations, and their incorporation into such formulations, are disclosed in U.S. Pat. No. 4,261,868 to Hora, et al., issued Apr. 14, 1981. In an embodiment, the liquid composition herein is substantially free of (i.e. contains no measurable amount of) wild-type protease enzymes. A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers

Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

A useful enzyme stabilizer system is a calcium and/or magnesium compound, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth) acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof. The detergent may contain a reversible protease inhibitor e.g., peptide or protein type, or a modified subtilisin inhibitor of family VI and the plasminostrepin; leupeptin, peptide trifluoromethyl ketone, or a peptide aldehyde. Enzyme stabilizers are present from about 1 to about 30, or from about 2 to about 20, or from about 5 to about 15, or from about 8 to about 12, millimoles of stabilizer ions per liter.

Catalytic Metal Complexes

Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

Solvents

Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally friendly solvents and mixtures thereof. In some embodiments, the solvent includes water. The water can include water from any source including deionized water, tap water, softened water, and combinations thereof. Solvents are typically present at from about 0.1% to about 50%, or from about 0.5% to about 35%, or from about 1% to about 15% by weight.

Form of the Compositions

The detergent compositions of the present disclosure may be of any suitable form, including paste, liquid, solid (such as tablets, powder/granules), foam or gel, with powders and tablets being preferred. The composition may be in the form of a unit dose product, i.e. a form which is designed to be used as a single portion of detergent composition in a washing operation. Of course, one or more of such single portions may be used in a cleaning operation.

Solid forms include, for example, in the form of a tablet, rod, ball or lozenge. The composition may be a particulate form, loose or pressed to shape or may be formed by injection moulding or by casting or by extrusion. The composition may be encased in a water soluble wrapping, for, example of PVOH or a cellulosic material. The solid product may be provided as a portioned product as desired.

The composition may also be in paste, gel or liquid form, including unit dose (portioned products) products. Examples include a paste, gel or liquid product at least partially surrounded by, and preferably substantially enclosed in a water-soluble coating, such as a polyvinyl alcohol package. This package may for instance take the form of a capsule, a pouch or a moulded casing (such as an injection moulded casing) etc. Preferably the composition is substantially surrounded by such a package, most preferably totally surrounded by such a package. Any such package may contain one or more product formats as referred to herein and the package may contain one or more compartments as desired, for example two, three or four compartments.

If the composition is a foam, a liquid or a gel it is preferably an aqueous composition although any suitable solvent may be used. According to an especially preferred embodiment of the present disclosure the composition is in the form of a tablet, most especially a tablet made from compressed particulate material.

If the compositions are in the form of a viscous liquid or gel they preferably have a viscosity of at least 50 mPas when measured with a Brookfield RV Viscometer at 25° C. with Spindle 1 at 30 rpm.

The compositions of the disclosure will typically be used by placing them in a detergent dispenser e.g. in a dishwasher machine draw or free standing dispensing device in an automatic dishwashing machine. However, if the composition is in the form of a foam, liquid or gel then it may be applied to by any additional suitable means into the dishwashing machine, for example by a trigger spray, squeeze bottle or an aerosol.

Processes of Making Cleaning Compositions

The compositions of the disclosure may be made by any suitable method depending upon their format. Suitable manufacturing methods for detergent compositions are well known in the art, non-limiting examples of which are described in U.S. Pat. Nos. 5,879,584; 5,691,297; 5,574,005; 5,569,645; 5,565,422; 5,516,448; 5,489,392; and 5,486,303. Various techniques for forming detergent compositions in solid forms are also well known in the art, for example, detergent tablets may be made by compacting granular/particular material and may be used herein.

In one aspect, the liquid detergent compositions disclosed herein may be prepared by combining the components thereof in any convenient order and by mixing, e.g., agitating, the resulting component combination to form a phase stable liquid detergent composition. In one aspect, a liquid matrix is formed containing at least a major proportion, or even substantially all, of the liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. All references cited herein are hereby incorporated in their entirety by reference.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Materials used in the following Examples are provided herein:

Example 1

Modified triglycerides, such as PEG modified castor oils, are not known to be able to form microemulsions with oily soils, such as triglycerides, silicone oils, and mineral oils, alone or with co-surfactants. Without being bound to a particular theory, it is thought that structure of the PEG modified oils may act as a "super-Gemini" surfactant due to the hydrophobic ends of the modified oil will act to cage the oil while the PEG will allow for better solubilization.

To determine if modified triglycerides alone and/or in combination with various surfactants result in microemulsions, various combinations were tested over broad temperature ranges and on different soil types (Table 1). Either 1 g of PEG-modified triglyceride was mixed with 1 g of zero grain water and a soil or a 2 g of a surfactant mix, comprising between 0.6 to 1 g PEG-modified triglyceride and between 1 to 1.4 g co-surfactant, was mixed with 2 g zero grain water and 2 g soil. The temperature range at which a microemulsion formed was then measured.

Table 1. Examples of PEG-modified triglycerides with or without co-surfactant(s) to form microemulsion with soil. (If it is not mentioned specifically in table, all examples were performed with 1:1:1 mass ratio of zero grain water, surfactants and soil.)

Tergitol 15-S-Sand S-3 are Secondary Alcohol Ethoxylate nonionic surfactants.

Tomadol 25-3 is an ethoxylated alcohol nonionic surfactant.

Lutensol is a nonionic saturated iso-C13-alcohol surfactant.

Ecosurf EH 6 is a 2-Ethyl hexanol EO-PO nonionic surfactant.

Ecosurf EH 9 is a 2-Ethyl nonyl EO-PO nonionic surfactant.

TABLE 1

| | PEG Modified triglyceride | Co-surfactants | Soil Type | Microemulsion Temperature |
|---|---|---|---|---|
| Pl | HCO -10 lg, Nikko Chemicals | None | Soybean | 130-140° F. |
| P14 | HCO-20 0.8 g, Nikko Chemicals | Tergitol 15-S-5 1.2 g | Light Mineral Oil | 130-140° F. |
| P16 | HCO-20 0.8 g, Nikko Chemicals | Tergitol 15-S-5 1.2 g | Silicone est 350 | Microemulsion below 140° F., translucent thick solution at room Temperature |
| P15 | HCO-20 0.8 g, Nikko Chemicals | Tergitol 15-S-5 1.2 g | Soybean | 128-142° F. |
| PIS | HCO-20 0.8 g, Nikko Chemicals | Tergitol 15-S-5 1.2 g | Beef Tallow | 130-147° F. |
| P19 | Tergitol ECO-20 0.8 g, Dow Chemicals | Tergitol 15-S-5 1.2 g | Soybean | 138-140° F.* Dow chemical ECO-20 has much narrower range of microemulsion |

TABLE 1-continued

| | PEG Modified triglyceride | Co-surfactants | Soil Type | Microemulsion Temperature |
|---|---|---|---|---|
| P20 | Tergitol ECO-20 0.6 g, Dow Chemicals | Tergitol 15-S-5 1.4 g | Soybean | 136° F. |
| P22 | Tergitol ECO-20 lg, Dow Chemicals | Tergitol 15-S-5 lg | Soybean | 138-145° F. |
| P27 | Tergitol ECO-20 lg, Dow Chemicals | Tergitol 15-S-3 lg | Soybean | Below 126° F. |
| P28 | Tergitol ECO-20 0.8 g, Dow Chemicals | Tergitol 15-S-3 1.2 g | Soybean | Microemulsion at room T |
| P30 | Tergitol ECO-20 0.6 g, Dow Chemicals | Tergitol 15-S-3 1.4 g | Soybean | 69-84° F. |
| P33 | Tergitol ECO-20 0.75 g, Dow Chemicals | Tergitol 15-S-3 1.25 g | Beef Tallow | 80-102° F. |
| P38 | Tergitol ECO-20 lg, Dow Chemicals | Lutensol TO3 1 g | Soybean | 76-l00° F. |
| P40 | Tergitol ECO-20 0.6 g, Dow Chemicals | Tergitol 15-S-3 1 g; Tergitol 15-S-5 0.4 g | Soybean | 88-l00° F. |
| P41 | Tergitol ECO-20 0.6 g, Dow Chemicals | Tomadol 25-3 1.4 g | Soybean | 120-125° F. |
| P45 | Tergitol ECO-20 lg, Dow Chemicals | Ecosurf EH-6 1 g | Soybean | 180-182° F. |
| P47 | Tergitol ECO-20 lg, Dow Chemicals | Ecosurf EH-3 lg | Soybean | 118-155° F. |
| P48 | Tergitol ECO-20 lg, Dow Chemicals | BASF C10PO8EO3 1 g | Soybean | Transparent gel at room T - 156° F. |
| P50 | Tergitol ECO-20 lg, Dow Chemicals | BASF C10PO8EO3 lg | Silicone est 350 | Transparent gel at room T - 125° F. |
| P54 | Tergitol ECO-20 0.8 g, Dow Chemicals | Ecosurf SA-4 1.2 g | Soybean | 126-150° F. |
| P56 | Tergitol ECO-20 lg, Dow Chemicals | Ecosurf SA-4 1 g | Soybean | 128-158° F. |
| P60 | Tergitol ECO-20 0.8 g, Dow Chemicals | Tornadol 91-2.5 1.2 g | Soybean | 120-128° F. |
| P61 | Tergitol ECO-20 0.8 g, Dow Chemicals | Novel 23E4 | Soybean | 115-127° F. |
| P62 | Tergitol ECO-20 0.8 g, Dow Chemicals | Surfonic LSF 23-3 | Soybean | 97-103° F. |
| P69 | Tergitol ECO-20 0.8 g, Dow Chemicals | Surfonic L24-3 NRE | Soybean | 104-106° F. |

As shown in Table 1, the PEG modified triglyceride with variable amounts of ethoxylation, alone or in combination with an ordinary co-surfactant such as straight chain alcohol ethoxylate, secondary alcohol ethoxylate, extended surfactant, etc., microemulsion with triglyceride can be easily made for different temperature ranges. Further, the combinations surprisingly appear to form microemulsions with multiple oils including triglyceride, silicone oils, and mineral oils, at similar temperature range. For Example, P20, P30, and P40 show that by altering the ratio of Tergitol 15-S-3 to Tergitol 15-S-5 while keeping the amount of overall surfactant the same, the temperature at which a microemulsion forms raises as the amount of Tergitol 15-S-5 increases. This shows that modified triglycerides, either alone or with a co-surfactant, may be utilized for a variety of soils across a variety of temperatures.

Example 2

To further determine investigate which combinations of modified triglycerides and co-surfactants may be used over which temperature ranges, the amount of two co-surfactants from P40 in Example 1 were varied and mixed with a PEG-modified castor oil. PEG modified triglyceride was mixed with one or both of the co-surfactants so that 0.6 g of PEG modified triglyceride and 1.4 g of the co-surfactants was mixed with 2 g soil and 2 g of zero grain water. Between 0 and 1.4 g of each co-surfactant was added to the composition. The temperature at which microemulsions was then recorded.

As shown in Table 1 and FIG. 1, as the amount of Tergitol 15-S-5 is increased in relation to Tergitol 15-S-3, (5 moles EO compared to 3 moles EO) the temperature at which microemulsions form increases from a low of about 69° F. with no Tergitol 15-S-5 to a high of about 136° F. with no Tergitol 15-S-3.

Table 2: Examples of PEG-modified castor oil with co-surfactant Tergitol 15-S-3 and Tergitol 15-S-5 to form microemulsion under different temperature. (If it is not mentioned specifically in table, all examples were performed with 1:1:1 mass ratio of zero grain water total 2 gram, surfactants total 2 gram with 0.6 gram Tergitol ECO-20 and soybean oil 2 gram.)

TABLE 2

| | | | | |
|---|---|---|---|---|
| P30 | Tergitol ECO-20 0.6 g | Tergitol 15-S-3 1.4 g | | 69-84° F. |
| P44 | Tergitol ECO-20 0.6 g | Tergitol 15-S-3 1.2 g | Tergitol 15-S-5 0.2 g | 76-92° F. |
| P40 | Tergitol ECO-20 0.6 g | Tergitol 15-S-3 lg | Tergitol 15-S-5 0.4 g | 88-I00° F. |

TABLE 2-continued

| | | | | |
|---|---|---|---|---|
| P41 | Tergitol ECO-20 0.6 g | Tergitol 15-S-3 0.7 g | Tergitol 15-S-5 0.7 g | 98-106° F. |
| P42 | Tergitol ECO-20 0.6 g | Tergitol 15-S-3 0.5 g | Tergitol 15-S-5 0.9 g | 108-116° F. |
| P43 | Tergitol ECO-20 0.6 g | Tergitol 15-S-3 0.2 g | Tergitol 15-S-5 1.2 g | 122-132° F. |
| P20 | Tergitol ECO-20 0.6 g | | Tergitol 15-S-5 1.4 g | 136° F. |

These results show that by altering the hydrophilic-lipophilic balance (HLP) of either the triglyceride or co-surfactants, such as by altering the amount of EO, PO, or BO, may be used to fine tune the temperature range in which the modified triglycerides may form microemulsions with a soil.

Example 3

While the above Examples show that the modified triglycerides may form microemulsions with soils over different temperature ranges, it is unknown if they are capable of sufficient interaction with various substrates to lift soils from said substrates. To determine the efficacy of the triglyceride compositions, different soils were applied to laundry (green, red, and white polyesters and a cotton towel) and then placed in a tergometer with compositions of the disclosure to assess their ability to remove the soils. The modified triglycerides with a co-surfactant were tested to determine their ability to remove soils from the surface of laundry was tested.

Procedure:

1.) Turn the tergotomer to set temperature and fill each of the 6 jars with IL 5-grain water.

2.) Allow the instrument to heat up for at least 1 hour before using.

3.) Number the 6 napkins with permanent marker and place a 25 μL drop of oil on the square.

4.) Prepare the surfactant by weight to reach a specified concentration.

5.) Set the timer to 21:00 and turn on the rotation on the tergotomer.

6.) Immediately drop the surfactant and its weighing dish into the instrument and water to stir for 1 minute 7.) After the minute has passed, drop the napkins into their corresponding container to stir for the remainder of the time.

8.) Turn off the tergotomer and remove the napkins to place in a plastic container.

9.) Rinse the napkins for 2-4 minutes under hot 5-grain water.

10.) Run the napkins through the iron until dry.

11.) Assess the level of oil removal and rank 1-3 (1=worst, 3=best).

12.) Return the napkins to the plastic container and rinse with ice water (5-grain) for 2-4 minutes.

13.) Again, assess the level of oil removal and rank accordingly.

A PEG modified castor oil was tested with either a Tergitol 15-S-5 (Table 3) or Surfonic L24-7 (Table 4). As shown in Table 3, between 0.2 and 0.6 g of the modified triglyceride was mixed with between 0.3 to 1 g of co-surfactant Tergitol 15-S-5. All the compositions showed excellent soil removal on a wide range of soils and surfaces. However, it did not show removal of red palm oil on the cotton substrate. This is likely due to the strong affinity that the significant amount of β-carotene in the red palm oils has for the cotton substrate. Further, the concentration of modified triglyceride with co-surfactant needed to remove the soil is surprisingly lower than what has been reported using optimal extended surfactant systems.

TABLE 3

Tergotometer test of modified triglyceride with Tergitol 15-S-5 on various laundry substrates.

| Run | Tergitol 15-S-5 (gram) | Tergitol ECO-20 (gram) | Visual Score (hot rinse) | Visual Score (cold rinse) | Napkin | Soil | Temp |
|---|---|---|---|---|---|---|---|
| 1 | 0.4 | 0.2 | 3, 3, 2.5, 2 | 3, 2, 2.5, 2 | Red Polyester | Olive, Motor, light mineral oil, Silicone est 350; 25μ 1 each | 140° F. |
| 2 | 0.6 | 0.4 | 3, 3, 3, 3 | 3, 3, 3, 3 | Red Polyester | Olive, Motor, light mineral oil, Silicone est 350; 25μ 1 each | 140° F. |
| 3 | 0.3 | 0.2 | 3 | 3 | Green Polyester | Olive 25μ 1 | 140° F. |
| 4 | 0.3 | 0.2 | 3, 3, 3, 2 | 3, 3, 3, 2 | Green Polyester | Olive, Motor, light mineral oil, Silicone est 350; 25μ 1 each | 140° F. |
| 5 | 0.6 | 0.4 | 3, 3, 3, 2 | 3, 3, 3, 2 | Green Polyester | Olive, Motor, light mineral oil, Silicone est 350; 25μ 1 each | 140° F. |
| 6 | 0.6 | 0.4 | 3, 3, 3, 3 | 3, 3, 3, 3 | White Poly-cotton | Olive, Motor, light mineral oil, Silicone est 350; 25μ 1 each | 140° F. |
| 7 | 0.6 | 0.4 | 3 | 3 | White Poly-cotton | Red Palm Oil | 140° F. |
| 8 | 0.45 | 0.3 | 3 | 3 | White Poly-cotton | Red Palm Oil | 140° F. |

TABLE 3-continued

Tergotometer test of modified triglyceride with Tergitol 15-S-5 on various laundry substrates.

| Run | Tergitol 15-S-5 (gram) | Tergitol ECO-20 (gram) | Visual Score (hot rinse) | Visual Score (cold rinse) | Napkin | Soil | Temp |
|---|---|---|---|---|---|---|---|
| 9 | 0.6 | 0.4 | 1 | 1 | Cotton Towel | Red Palm Oil | 140° F. |
| 10 | 0.9 | 0.6 | 1 | 1 | Cotton Towel | Red Palm Oil | 140° F. |
| 11 | 1 | 0.5 | 2, 2.5 | 2.5, 3 | Cotton Towel | Red Palm Oil, Olive | 160° F. |
| 12 | 0.67 | 0.33 | 1.5, 3 | 2, 3 | Cotton Towel | Red Palm Oil, Olive | 140° F. |
| 13 | 0.67 | 0.33 | 1, 1 | 1, 1 | Cotton Towel | Red Palm Oil, Olive | 140° F. (with 4 g 50% NaOH) |
| 14 | 0.67 | 0.33 | 2, 3 | 2.5, 3 | Cotton Towel | Red Palm Oil, Olive | 160° F. |

Table 4 shows the results of 0.4 g modified triglyceride mixed with 0.6 g of co-surfactant, either Surfonic L24-3 or L24-7, on the removal of various soils from green polyester. As the results show, Surfonic L27-3, a straight chain alcohol ethoxylate, showed exceptional soil removal across multiple types of oils, including olive, motor, light mineral, and silicone cst 350.

TABLE 4

Tergotometer test of modified triglyceride with other co-surfactants.

| Run | Surfactant Tergitol ECO-20 | Co-surfactant | Visual Score (hot rinse) | Visual Score (cold rinse) | Napkin | Soil | Temp |
|---|---|---|---|---|---|---|---|
| 1 | 0.4 | Surfonic L24-3 NRE0.6 | 3, 3, 3, 2 | 3, 3, 3, 2 | Green Polyester | Olive, Motor, light mineral oil, Silicone est 350; 25μ 1 each | 140° F. |
| 2 | 0.4 | Surfonic L24-7 NRE0.6 | 1, 1, 1, 1 | 1, 1, 1, 1 | Green Polyester | Olive, Motor, light mineral oil, Silicone est 350; 25μ 1 each | 140° F. |

Example 4

Figure 2:
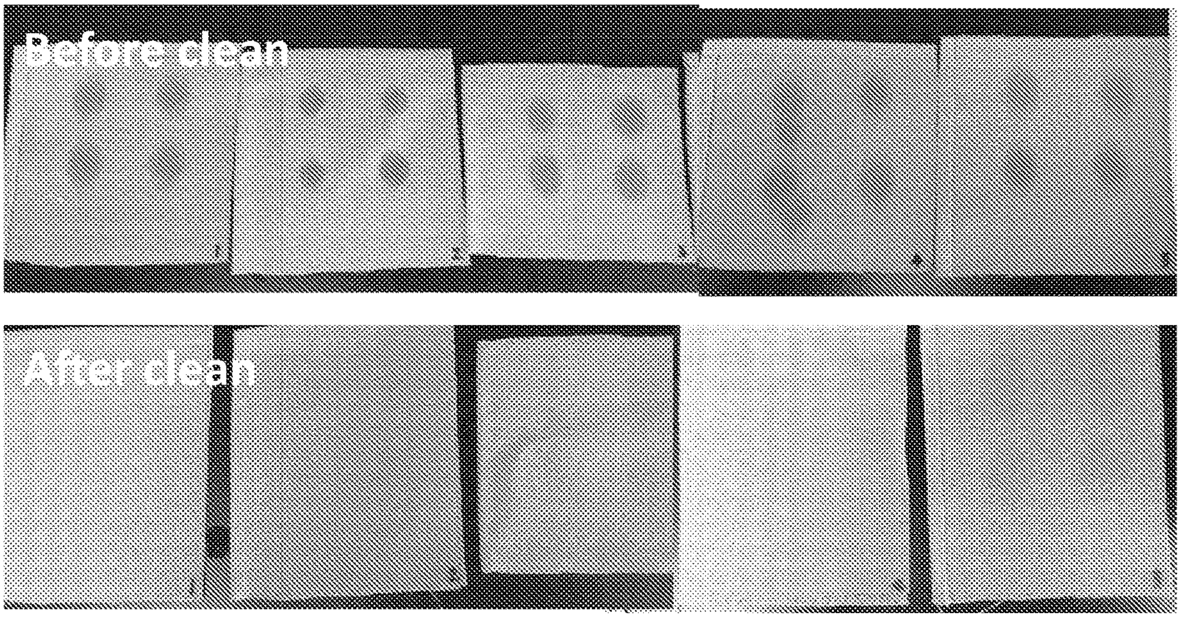
FIG. 2 shows pictures of PEG-modified castor oil with co-surfactant NRE 24-3 and compared with Extended surfactant at low temperature (100 F) on fabric.

A PEG modified castor oil was tested with Narrow range NRE 24-3 comparing with extended surfactant Guerbet C10 alcohol $(PO)_8$ $(EO)_6$ (Table 5 and FIG. 2) at 100 F. As shown in Table 5, four types of different oils were deposited on the polyester surface, 0.2 g of the PEG modified castor oil was mixed with 0.3 g of co-surfactant NRE 24-3. As a comparison, 1 g of Extended surfactant with 0.6 g co-surfactant Lutensol XL40 was also tested with olive oil. FIG. 2 showed that PEG modified castor oil formula had completely removed the olive oil and light mineral oil stains. A slightly stains of silicone oil and motor oil were remained on surface. However, for Extended surfactant formula, all olive oil stains were still visible on surface. The PEG-modified castor oil drastically out-performs the extended surfactant at low temperature.

TABLE 5

Examples of PEG-modified castor oil with co-surfactant NRE 24-3 and compared with Extended surfactant at low temperature (100 F.).

| Surfactants | Oil Drops |
|---|---|
| #1 0.2 g Sasol ECO20 + 0.3 g NRE24-3 | 4 drops of 25 ul olive oil |
| #2 0.2 g Sasol ECO20 + 0.3 g NRE24-3 | 4 drops of 25 ul silicone oil cst 350 |
| #3 0.2 g Sasol ECO20 + 0.3 g NRE24-3 | 4 drops of 25 ul motor oil 10W30 |
| #4 0.2 g Sasol ECO20 + 0.3 g NRE24-3 | 4 drops of 25 ul light mineral oil |
| #5 1 g Guerbet C10 alcohol $(PO)_8$ $(EO)_6$ + 0.6 g Lutensol XL40 | 4 drops of 25 ul olive oil |

See FIG. 2 for examples of PEG-modified castor oil with co-surfactant NRE 24-3 and compared with Extended surfactant at low temperature (100 F).

The disclosures being thus described, it will be obvious that the same may be varied in many ways. Such variations are not to be regarded as a departure from the spirit and scope of the disclosures and all such modifications are intended to be included within the scope of the following claims. The above specification provides a description of the manufacture and use of the disclosed compositions and methods. Since many embodiments can be made without departing from the spirit and scope of the disclosure, the disclosure resides in the claims.

What is claimed is:

1. A composition for forming stable emulsions or microemulsions with oils comprising:

between about 45 wt. % and about 80 wt. % of a surfactant system comprising a PEG modified triglyceride of the following formula:

$$R^1CO_2(CH_2CH_2O)_lCH_2CH(OCH_2CH_2)_m(O_2CR^2)CH_2(CH_2CH_2O)_nCO_2R^3$$

wherein $R^1$, $R^2$, and $R^3$ are the same or different lipophilic moiety, a linear or branched, saturated or unsaturated, substituted or unsubstituted, aliphatic or aromatic hydrocarbon radical having from about 8 to 30 carbon atoms; and l, m, and n are the same or different number of moles of ethylene oxide (EO), having from about 1 to about 100 moles, wherein the PEG modified triglyceride is included in an amount sufficient to reduce surface tension and form a microemulsion; and one or more additional components comprising one or more of builders, chelating agents, dye transfer inhibiting agents, viscosity modifiers, dispersants, additional enzymes, and enzyme stabilizers, catalytic materials, bleaches, bleach activators, hydrogen peroxide, sources of hydrogen peroxide, preformed peracids, polymeric dispersing agents, threshold inhibitors for hard water precipitation pigments, clay soil removal/anti-redeposition agents, brighteners, suds suppressors, dyes, fabric hueing agents, perfumes, structure elasticizing agents, fabric softeners, carriers, additional hydrotropes, processing aids, solvents, pigments antimicrobials, pH buffers, processing aids, active fluorescent whitening ingredient, additional surfactants and mixtures thereof, wherein the composition is capable of forming a stable emulsion or microemulsion with oils.

2. The composition of claim 1 wherein said triglyceride is a modified castor oil, soybean oil or olive oil.

3. The composition of claim 1 further comprising a co-surfactant.

4. The composition of claim 3 wherein said co-surfactant is an alcohol alkoxylate.

5. The composition of claim 4 wherein said co-surfactant is a branched alcohol ethoxylate.

6. The composition of claim 5 wherein said branched alcohol ethoxylate has at least one mole of ethoxylate.

7. The composition of claim 1 wherein said composition forms an emulsion with oil at approximately 69 degrees F.

8. The composition of claim 3 wherein said co-surfactant has at least 1 mole of ethylene oxide.

9. The composition of claim 1 wherein said system forms an emulsion with oil at approximately 136 degrees F.

10. The composition of claim 3 wherein said co-surfactant is a straight chain alcohol ethoxylate.

11. The composition of claim 10 wherein said straight chain alcohol ethoxylate has at least one mole of ethoxylate.

12. The composition of claim 3 wherein said co-surfactant is an extended surfactant.

13. The composition of claim 3 wherein said co-surfactant is an ionic surfactant.

14. The composition of claim 3 wherein said co-surfactant is a cationic surfactant.

15. The composition of claim 3 wherein said co-surfactant is a amphoteric surfactant.

16. The composition of claim 3 wherein said co-surfactant is a poly(ethylene oxide)-poly(propylene oxide) block copolymer, linear or branched.

17. The composition of claim 3 wherein said co-surfactant is a alkyl polyglycoside.

18. The cleaning composition of claim 1 wherein said cleaning composition is a hard surface cleaner.

19. The cleaning composition of claim 1 wherein said cleaning composition is a laundry detergent.

20. An emulsion or microemulsion comprising the cleaning composition of claim 1 and an oil component of an oil, fatty acid, or triglyceride or combination thereof.

21. The emulsion or microemulsion of claim 20 wherein said oil is a vegetable oil.

22. The emulsion or microemulsion of claim 20 wherein said oil is a synthetic oil.

23. The emulsion or microemulsion of claim 20 wherein said oil is a triglyceride.

24. The emulsion or microemulsion of claim 20 wherein said oil is a non-trans fat.

25. A method for removing a soil from a hard surface comprising applying a cleaning composition containing the surfactant system according to claim 1 to the hard surface and rinsing and/or wiping the cleaning composition from the hard surface.

26. A method for removing a soil from a soft surface comprising applying a cleaning composition containing the surfactant system according to claim 1 to the soft surface and rinsing and/or wiping the cleaning composition from the soft surface.

27. An irreversible emulsion or microemulsion product comprising:

about 33.3 wt. % of a surfactant system comprising a PEG modified triglyceride;

about 33.3 wt. % of an oil; and about 33.3 wt. % of water, wherein the components, when heated to about 60 to 180 degrees F. form a stable irreversible emulsion or microemulsion.

28. The emulsion or microemulsion product of claim 27 wherein said PEG modified triglyceride is a modified castor oil.

29. The emulsion or microemulsion product of claim 27 wherein said PEG modified triglyceride is polyethylene glycol modified castor oil.

30. The emulsion or microemulsion of claim 27 wherein said oil is a vegetable oil.

31. The emulsion or microemulsion of claim 27 wherein said oil is soybean oil.

32. The emulsion or microemulsion product of claim 27 further comprising one or more additional co-surfactants.

33. The emulsion or microemulsion product of claim 32 wherein said co-surfactant is a branched chain alcohol ethoxylate.

34. The emulsion or microemulsion product of claim 33 wherein said branched chain alcohol ethoxylate has at least 1 mole of ethoxylate.

35. The emulsion or microemulsion product of claim 27 wherein said system forms an emulsion with oil at approximately 69 degrees F.

36. The emulsion or microemulsion product of claim 32 wherein said co-surfactant has at least 1 mole of ethylene oxide.

37. The emulsion or microemulsion product of claim 27 wherein said emulsion or microemulsion product forms an emulsion with oil at approximately 136 degrees F.

38. The emulsion or microemulsion product of claim 32 wherein said co-surfactant is a straight chain alcohol ethoxylate.

39. The emulsion or microemulsion product of claim 38 wherein said straight chain alcohol ethoxylate has at least one mole of ethoxylate.

40. The emulsion or microemulsion product of claim 32 wherein said co-surfactant is an extended surfactant.

41. The emulsion or microemulsion product of claim 32 wherein said co-surfactant is an ionic surfactant.

42. The emulsion or microemulsion product of claim 32 wherein said co-surfactant is a cationic surfactant.

43. The emulsion or microemulsion product of claim 34 wherein said co-surfactant is an amphoteric surfactant.

44. The emulsion or microemulsion product of claim 32 wherein said co-surfactant is a poly(ethylene oxide)-poly (propylene oxide) block copolymer, linear or branched.

45. The emulsion or microemulsion product of claim 32 wherein said co-surfactant is an alkyl polyglycoside.

46. A method of forming stable and irreversible emulsions with non-trans fats and fatty acids comprising:

mixing about 33.3 wt. % of a surfactant system comprising a PEG modified triglyceride of the following formula:

$$R^1CO_2(CH_2CH_2O)_lCH_2CH(OCH_2CH_2)_m(O_2CR^2)CH_2(CH_2CH_2O)_nCO_2R^3$$

wherein $R^1$, $R^2$, and $R^3$ are the same or different lipophilic moiety, a linear or branched, saturated or unsaturated, substituted or unsubstituted, aliphatic or aromatic hydrocarbon radical having from about 8 to 30 carbon atoms; and l, m, and n are the same or different number of moles of ethylene oxide (EO), having from about 1 to about 100 moles, about 33.3 wt. % water, and about 33.3 wt. % of a non-trans-fat and/or fatty acid.

* * * * *